(12) United States Patent
Rocholl et al.

(10) Patent No.: US 11,505,403 B2
(45) Date of Patent: *Nov. 22, 2022

(54) CARRY CAN FOR REFUSE VEHICLE

(71) Applicant: Oshkosh Corporation, Oshkosh, WI (US)

(72) Inventors: Joshua D. Rocholl, Rochester, MN (US); Derek A. Wente, Austin, MN (US); John T. Kellander, Oronoco, MN (US); Cody D. Clifton, Mapleton, MN (US); Vincent Hoover, Byron, MN (US); Zachary L. Klein, Rochester, MN (US); Clinton T. Weckwerth, Pine Island, MN (US); Skylar A. Wachter, Dodge Center, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,299

(22) Filed: Apr. 17, 2020

(65) Prior Publication Data
US 2020/0346854 A1 Nov. 5, 2020

Related U.S. Application Data

(60) Provisional application No. 62/842,971, filed on May 3, 2019.

(51) Int. Cl.
*B65F 3/04* (2006.01)
*B65F 3/02* (2006.01)
(Continued)

(52) U.S. Cl.
CPC ............... *B65F 3/041* (2013.01); *B60L 8/003* (2013.01); *B65F 3/08* (2013.01);
(Continued)

(58) Field of Classification Search
CPC ...... B65F 3/041; B65F 3/06; B65F 2003/025; B65F 2003/0263; B65F 2003/0279
(Continued)

(56) References Cited

U.S. PATENT DOCUMENTS 3,662,911 A * 5/1972 Harman .................... B64F 1/22
414/430
3,666,126 A 5/1972 Rempel
(Continued)

OTHER PUBLICATIONS

U.S. Appl. No. 16/851,152, filed Apr. 17, 2020, Oshkosh Corporation.

*Primary Examiner* — James Keenan
(74) *Attorney, Agent, or Firm* — Foley & Lardner LLP

(57) ABSTRACT

A vehicle system includes a refuse vehicle, a carry can, and an electric energy system. The refuse vehicle includes a chassis, a body assembly coupled to the chassis, and a lift assembly. The body assembly defines a vehicle refuse compartment. The carry can is selectively couplable to the lift assembly. The carry can includes a container defining a container refuse compartment and an articulating collection arm coupled the container. The articulating collection arm has an actuator positioned to facilitate manipulating the articulating collection arm. The electric energy system is at least one of positioned on the refuse vehicle or positioned on the carry can. The electric energy system is configured to facilitate operating the actuator of the articulating collection arm.

3 Claims, 25 Drawing Sheets

(51) Int. Cl.
*B65F 3/08* (2006.01)
*B60L 8/00* (2006.01)

(52) U.S. Cl.
CPC . *B65F 2003/025* (2013.01); *B65F 2003/0263* (2013.01); *B65F 2003/0279* (2013.01)

(58) Field of Classification Search
USPC .................................. 414/406–410
See application file for complete search history.

(56) References Cited

U.S. PATENT DOCUMENTS

| | | | |
|---|---|---|---|
| 3,804,277 A | 4/1974 | Brown et al. | |
| 4,016,988 A | 4/1977 | Dahlin | |
| 4,096,959 A | 6/1978 | Schaffler | |
| 4,175,903 A | 11/1979 | Carson | |
| 4,200,330 A | 4/1980 | Scott | |
| 4,225,182 A | 9/1980 | Werner | |
| 4,229,135 A * | 10/1980 | Malmros | B65G 1/10 312/198 |
| 4,252,495 A | 2/1981 | Cook | |
| 4,286,911 A * | 9/1981 | Benjamin | B65G 1/0414 191/1 R |
| 4,441,848 A | 4/1984 | Bailey | |
| 4,618,306 A | 10/1986 | Dorsch | |
| 4,704,062 A | 11/1987 | Hale | |
| 4,771,837 A | 9/1988 | Appleton et al. | |
| 5,171,121 A | 12/1992 | Smith et al. | |
| 5,378,010 A | 1/1995 | Marino et al. | |
| 5,639,201 A | 6/1997 | Curotto | |
| 5,731,705 A | 3/1998 | Guinn | |
| 5,833,428 A | 11/1998 | Szinte | |
| 5,919,026 A | 7/1999 | Appleton | |
| 5,919,027 A | 7/1999 | Christenson | |
| 5,934,858 A | 8/1999 | Christenson | |
| 5,934,867 A | 8/1999 | Christenson | |
| 5,938,394 A | 8/1999 | Christenson | |
| 5,951,235 A | 9/1999 | Young et al. | |
| 5,967,731 A | 10/1999 | Brandt | |
| 5,971,694 A | 10/1999 | McNeilus et al. | |
| 5,984,609 A | 11/1999 | Bartlett | |
| 6,033,176 A | 3/2000 | Bartlett | |
| 6,062,803 A | 5/2000 | Christenson | |
| 6,071,057 A * | 6/2000 | Duron | B65F 3/001 414/406 |
| 6,089,813 A | 7/2000 | McNeilus et al. | |
| 6,105,984 A | 8/2000 | Schmitz et al. | |
| 6,120,235 A | 9/2000 | Humphries et al. | |
| 6,123,500 A | 9/2000 | McNeilus et al. | |
| 6,135,536 A * | 10/2000 | Ciavaglia | E05F 15/614 296/106 |
| 6,210,094 B1 | 4/2001 | McNeilus et al. | |
| 6,213,706 B1 | 4/2001 | Christenson | |
| 6,224,317 B1 | 5/2001 | Kann et al. | |
| 6,224,318 B1 | 5/2001 | McNeilus et al. | |
| 6,247,713 B1 | 6/2001 | Konop | |
| 6,266,598 B1 | 7/2001 | Pillar et al. | |
| 6,315,515 B1 | 11/2001 | Young et al. | |
| 6,336,783 B1 | 1/2002 | Young et al. | |
| 6,350,098 B1 | 2/2002 | Christenson et al. | |
| 6,421,593 B1 | 7/2002 | Kempen et al. | |
| 6,447,239 B2 | 9/2002 | Young et al. | |
| 6,474,928 B1 | 11/2002 | Christenson | |
| 6,497,547 B1 | 12/2002 | Maglaras | |
| 6,516,914 B1 | 2/2003 | Andersen et al. | |
| 6,553,290 B1 | 4/2003 | Pillar | |
| 6,565,305 B2 | 5/2003 | Schrafel | |
| 6,652,213 B1 * | 11/2003 | Mitchell | B65G 1/0492 414/279 |
| 6,846,148 B2 | 1/2005 | Romeva et al. | |
| 7,018,155 B1 * | 3/2006 | Heberling | B62B 3/0606 414/408 |
| 7,070,382 B2 | 7/2006 | Pruteanu et al. | |
| 7,261,354 B1 * | 8/2007 | Lozano | B60J 7/1614 296/26.05 |
| 7,284,943 B2 | 10/2007 | Pruteanu et al. | |
| 7,556,468 B2 | 7/2009 | Grata | |
| 7,559,735 B2 | 7/2009 | Pruteanu et al. | |
| 7,597,172 B1 | 10/2009 | Kovach et al. | |
| 7,654,354 B1 | 2/2010 | Otterstrom | |
| 7,878,750 B2 | 2/2011 | Zhou et al. | |
| 8,182,194 B2 | 5/2012 | Pruteanu et al. | |
| 8,215,892 B2 | 7/2012 | Calliari | |
| 8,360,706 B2 | 1/2013 | Addleman et al. | |
| 8,398,176 B2 | 3/2013 | Haroldsen et al. | |
| 8,540,475 B2 | 9/2013 | Kuriakose et al. | |
| 8,550,764 B2 | 10/2013 | Rowland et al. | |
| 8,554,643 B2 * | 10/2013 | Kortelainen | B65G 1/0435 414/284 |
| 8,807,613 B2 | 8/2014 | Howell et al. | |
| 8,857,567 B1 | 10/2014 | Raymond | |
| 9,045,014 B1 | 6/2015 | Verhoff et al. | |
| 9,067,730 B2 | 6/2015 | Curotto | |
| 9,114,804 B1 | 8/2015 | Shukla et al. | |
| 9,132,736 B1 | 9/2015 | Shukla et al. | |
| 9,174,686 B1 | 11/2015 | Messina et al. | |
| 9,216,856 B2 | 12/2015 | Howell et al. | |
| 9,290,093 B2 | 3/2016 | Turner et al. | |
| 9,296,558 B2 | 3/2016 | Parker | |
| 9,376,102 B1 | 6/2016 | Shukla et al. | |
| 9,511,932 B2 | 12/2016 | Curotto et al. | |
| 9,656,640 B1 | 5/2017 | Verhoff et al. | |
| 9,707,869 B1 | 7/2017 | Messina et al. | |
| 9,880,581 B2 | 1/2018 | Kuriakose et al. | |
| 9,902,559 B2 | 2/2018 | Parker | |
| 9,926,134 B2 | 3/2018 | Ford | |
| 9,981,803 B2 | 5/2018 | Davis et al. | |
| 10,035,648 B2 * | 7/2018 | Haddick | B65F 3/02 |
| 10,144,584 B2 | 12/2018 | Parker | |
| 10,144,585 B2 | 12/2018 | Curotto | |
| 10,196,205 B2 | 2/2019 | Betz et al. | |
| D843,281 S | 3/2019 | Gander et al. | |
| 10,351,340 B2 | 7/2019 | Haddick et al. | |
| 10,414,067 B2 | 9/2019 | Datema et al. | |
| 10,414,266 B1 | 9/2019 | Wiegand et al. | |
| 10,456,610 B1 | 10/2019 | Betz et al. | |
| 10,457,533 B2 | 10/2019 | Puszkiewicz et al. | |
| D869,332 S | 12/2019 | Gander et al. | |
| D871,283 S | 12/2019 | Gander et al. | |
| 10,513,392 B2 | 12/2019 | Haddick et al. | |
| 10,556,622 B1 | 2/2020 | Calliari et al. | |
| 10,558,234 B2 | 2/2020 | Kuriakose et al. | |
| 10,611,204 B1 | 4/2020 | Zhang et al. | |
| 10,647,025 B2 | 5/2020 | Fox et al. | |
| D888,629 S | 6/2020 | Gander et al. | |
| 11,097,617 B2 | 8/2021 | Rocholl et al. | |
| 2002/0014754 A1 | 2/2002 | Konop | |
| 2002/0065594 A1 | 5/2002 | Squires et al. | |
| 2002/0103580 A1 | 8/2002 | Yakes et al. | |
| 2003/0091417 A1 * | 5/2003 | Swann | B62B 5/0083 414/458 |
| 2003/0130765 A1 | 7/2003 | Pillar et al. | |
| 2003/0158638 A1 | 8/2003 | Yakes et al. | |
| 2003/0158640 A1 | 8/2003 | Pillar et al. | |
| 2003/0163228 A1 | 8/2003 | Pillar et al. | |
| 2003/0163229 A1 | 8/2003 | Pillar et al. | |
| 2003/0163230 A1 | 8/2003 | Pillar et al. | |
| 2003/0171854 A1 | 9/2003 | Pillar et al. | |
| 2003/0200015 A1 | 10/2003 | Pillar | |
| 2003/0205422 A1 | 11/2003 | Morrow et al. | |
| 2004/0004346 A1 | 1/2004 | Humphries | |
| 2004/0019414 A1 | 1/2004 | Pillar et al. | |
| 2004/0024502 A1 | 2/2004 | Squires et al. | |
| 2004/0039510 A1 | 2/2004 | Archer et al. | |
| 2004/0069865 A1 | 4/2004 | Rowe et al. | |
| 2004/0133332 A1 | 7/2004 | Yakes et al. | |
| 2005/0080520 A1 | 4/2005 | Kline et al. | |
| 2005/0109549 A1 | 5/2005 | Morrow | |
| 2005/0113988 A1 | 5/2005 | Nasr et al. | |
| 2005/0114007 A1 | 5/2005 | Pillar et al. | |
| 2005/0119806 A1 | 6/2005 | Nasr et al. | |
| 2005/0209747 A1 | 9/2005 | Yakes et al. | |
| 2005/0234622 A1 | 10/2005 | Pillar et al. | |
| 2005/0285365 A1 | 12/2005 | Manser et al. | |

(56) References Cited

U.S. PATENT DOCUMENTS

| | | |
|---|---|---|
| 2006/0065451 A1 | 3/2006 | Morrow et al. |
| 2006/0065453 A1 | 3/2006 | Morrow et al. |
| 2006/0066109 A1 | 3/2006 | Nasr |
| 2006/0070776 A1 | 4/2006 | Morrow et al. |
| 2006/0070788 A1 | 4/2006 | Schimke |
| 2006/0071466 A1 | 4/2006 | Rowe et al. |
| 2006/0071645 A1 | 4/2006 | Bolton |
| 2006/0106521 A1 | 5/2006 | Nasr et al. |
| 2006/0280582 A1 | 12/2006 | Kouri |
| 2007/0061054 A1 | 3/2007 | Rowe et al. |
| 2007/0088469 A1 | 4/2007 | Schmiedel et al. |
| 2007/0173987 A1 | 7/2007 | Rowe et al. |
| 2007/0185625 A1 | 8/2007 | Pillar et al. |
| 2007/0288131 A1 | 12/2007 | Yakes et al. |
| 2007/0291130 A1 | 12/2007 | Broggi et al. |
| 2007/0292249 A1* | 12/2007 | Wilson .................. B62B 3/104 414/444 |
| 2008/0004777 A1 | 1/2008 | Quigley |
| 2008/0012280 A1 | 1/2008 | Humphries |
| 2008/0059014 A1 | 3/2008 | Nasr et al. |
| 2008/0065285 A1 | 3/2008 | Yakes et al. |
| 2008/0071438 A1 | 3/2008 | Nasr et al. |
| 2008/0114513 A1 | 5/2008 | Pillar et al. |
| 2008/0150350 A1 | 6/2008 | Morrow et al. |
| 2008/0215190 A1 | 9/2008 | Pillar et al. |
| 2008/0221754 A1 | 9/2008 | Rowe et al. |
| 2009/0018716 A1 | 1/2009 | Ambrosio |
| 2009/0079839 A1 | 3/2009 | Fischer et al. |
| 2009/0127010 A1 | 5/2009 | Morrow et al. |
| 2009/0194347 A1 | 8/2009 | Morrow et al. |
| 2009/0205885 A1 | 8/2009 | Strong |
| 2010/0116569 A1 | 5/2010 | Morrow et al. |
| 2010/0183410 A1 | 7/2010 | Curotto |
| 2010/0281654 A1 | 11/2010 | Curotto |
| 2010/0301668 A1 | 12/2010 | Yakes et al. |
| 2011/0312459 A1 | 12/2011 | Morrow et al. |
| 2012/0143430 A1 | 6/2012 | Broggi et al. |
| 2013/0196806 A1 | 8/2013 | Morrow et al. |
| 2014/0020415 A1 | 1/2014 | Heyl |
| 2014/0257621 A1 | 9/2014 | Zych |
| 2014/0291045 A1 | 10/2014 | Collett et al. |
| 2015/0093220 A1 | 4/2015 | Parker |
| 2015/0159564 A1 | 6/2015 | Wildgrube et al. |
| 2015/0165871 A1 | 6/2015 | Miller et al. |
| 2015/0283894 A1 | 10/2015 | Morrow et al. |
| 2015/0321546 A1 | 11/2015 | Oue et al. |
| 2016/0001765 A1 | 1/2016 | Shukla et al. |
| 2016/0023548 A1 | 1/2016 | Crist et al. |
| 2016/0059690 A1 | 3/2016 | Wildgrube |
| 2016/0152188 A1 | 6/2016 | Handschke et al. |
| 2016/0297417 A1 | 10/2016 | Shukla et al. |
| 2016/0361987 A1 | 12/2016 | Morrow et al. |
| 2017/0008507 A1 | 1/2017 | Shukla et al. |
| 2017/0036628 A1 | 2/2017 | Nelson et al. |
| 2017/0121108 A1 | 5/2017 | Davis et al. |
| 2017/0158050 A1 | 6/2017 | Crist et al. |
| 2017/0253221 A1 | 9/2017 | Verhoff et al. |
| 2017/0341860 A1 | 11/2017 | Dodds et al. |
| 2017/0349373 A1 | 12/2017 | Gentry et al. |
| 2017/0349374 A1 | 12/2017 | Haddick et al. |
| 2017/0361491 A1 | 12/2017 | Datema et al. |
| 2017/0361492 A1 | 12/2017 | Datema et al. |
| 2018/0072303 A1 | 3/2018 | Shukla et al. |
| 2018/0215354 A1 | 8/2018 | Linsmeier et al. |
| 2018/0250847 A1 | 9/2018 | Wurtz et al. |
| 2018/0327183 A1 | 11/2018 | Peek et al. |
| 2018/0334324 A1 | 11/2018 | Haddick et al. |
| 2018/0345783 A1 | 12/2018 | Morrow et al. |
| 2019/0039407 A1 | 2/2019 | Smith |
| 2019/0047413 A1 | 2/2019 | Crist et al. |
| 2019/0091890 A1 | 3/2019 | Rocholl et al. |
| 2019/0118721 A1 | 4/2019 | Handschke et al. |
| 2019/0121353 A1 | 4/2019 | Datema et al. |
| 2019/0137324 A1 | 5/2019 | Curotto |
| 2019/0185077 A1 | 6/2019 | Smith et al. |
| 2019/0193934 A1 | 6/2019 | Rocholl et al. |
| 2019/0270587 A1 | 9/2019 | Haddick et al. |
| 2019/0291711 A1 | 9/2019 | Shukla et al. |
| 2019/0292975 A1 | 9/2019 | Hou et al. |
| 2019/0299791 A1 | 10/2019 | Gonze et al. |
| 2019/0322321 A1 | 10/2019 | Schwartz et al. |
| 2019/0325220 A1 | 10/2019 | Wildgrube et al. |
| 2019/0344475 A1 | 11/2019 | Datema et al. |
| 2019/0351758 A1 | 11/2019 | Wiegand et al. |
| 2019/0351883 A1 | 11/2019 | Verhoff et al. |
| 2019/0359184 A1 | 11/2019 | Linsmeier et al. |
| 2019/0360600 A1 | 11/2019 | Jax et al. |
| 2019/0381990 A1 | 12/2019 | Shukla et al. |
| 2020/0031641 A1 | 1/2020 | Puszkiewicz et al. |
| 2020/0038700 A1 | 2/2020 | Betz et al. |
| 2020/0039341 A1 | 2/2020 | Morrow et al. |
| 2020/0047586 A1 | 2/2020 | Gonze et al. |
| 2020/0078986 A1 | 3/2020 | Clifton et al. |
| 2020/0087063 A1 | 3/2020 | Haddick et al. |
| 2020/0102145 A1 | 4/2020 | Nelson et al. |
| 2020/0130746 A1 | 4/2020 | Calliari et al. |
| 2020/0230841 A1 | 7/2020 | Datema et al. |
| 2020/0230842 A1 | 7/2020 | Datema et al. |
| 2020/0231035 A1 | 7/2020 | Crist et al. |
| 2020/0262366 A1 | 8/2020 | Wildgrube et al. |
| 2020/0265656 A1 | 8/2020 | Koga et al. |
| 2021/0253347 A1 | 8/2021 | Pung |

* cited by examiner

CARRY CAN FOR REFUSE VEHICLE

CROSS-REFERENCE TO RELATED PATENT APPLICATION

This application claims the benefit of U.S. Provisional Patent Application No. 62/842,971, filed May 3, 2019, which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment relates to a vehicle system. The vehicle system includes a refuse vehicle, a carry can, and an electric energy system. The refuse vehicle includes a chassis, a body assembly coupled to the chassis, and a lift assembly. The body assembly defines a vehicle refuse compartment. The carry can is selectively couplable to the lift assembly. The carry can includes a container defining a container refuse compartment and an articulating collection arm coupled the container. The articulating collection arm has an actuator positioned to facilitate manipulating the articulating collection arm. The electric energy system is at least one of positioned on the refuse vehicle or positioned on the carry can. The electric energy system is configured to facilitate operating the actuator of the articulating collection arm.

Another embodiment relates to a carry can for a refuse vehicle. The carry can includes a container, an electric energy system, and a collection arm. The container defines a refuse compartment. The container includes an interface configured to facilitate selectively coupling the container to a lift assembly of the refuse vehicle. The electric energy system includes at least one of (i) a battery configured to store energy, (ii) a generator or a solar panel configured to generate energy, or (iii) a power interface configured to receive energy from an external electrical power source. The collection arm is coupled to the container. The collection arm includes an extension mechanism, a lift mechanism, and a grabber mechanism. The extension mechanism includes an extendable arm and a first actuator positioned to facilitate extending and retracting the extendable arm. The lift mechanism is coupled to an end of the extendable arm. The lift mechanism includes a lift arm and a second actuator positioned to facilitate pivoting the lift arm about a pivot axis. The grabber mechanism is coupled to an end of the lift arm. The grabber mechanism includes grabber arms and a third actuator positioned to facilitate opening and closing the grabber arms. At least one of the first actuator, the second actuator, or the third actuator is at least one of (i) an electrically operated actuator powered by the electric energy system or (ii) a hydraulically operated actuator coupled to a hydraulic pump driven by an electric motor powered by the electric energy system.

Still another embodiment relates to a carry can for a refuse vehicle. The carry can includes a container defining a refuse compartment, a battery coupled to or disposed within the container and configured to store energy, a power interface configured to receive energy from an external power source, a communications interface configured to receive commands from an external device, and an articulating collection arm coupled to the container. The articulating collection arm includes an extension mechanism, a lift mechanism, and a grabber mechanism. The extension mechanism includes an extendable arm and a first actuator positioned to facilitate extending and retracting the extendable arm. The lift mechanism is coupled to an end of the extendable arm. The lift mechanism includes a lift arm and a second actuator positioned to facilitate pivoting the lift arm about a pivot axis. The grabber mechanism is coupled to an end of the lift arm. The grabber mechanism includes grabber arms and a third actuator positioned to facilitate opening and closing the grabber arms. Each of the first actuator, the second actuator, and the third actuator is an electrically operated actuator powered by the battery.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle includes a lift assembly configured to interface with a carry can. The carry can has an articulating robotic arm coupled thereto. The articulating robotic arm includes one or more electric actuators. At least one of the refuse vehicle or the carry includes an electric energy system that provides power to the one or more electric actuators.

Overall Vehicle

Figure 1:
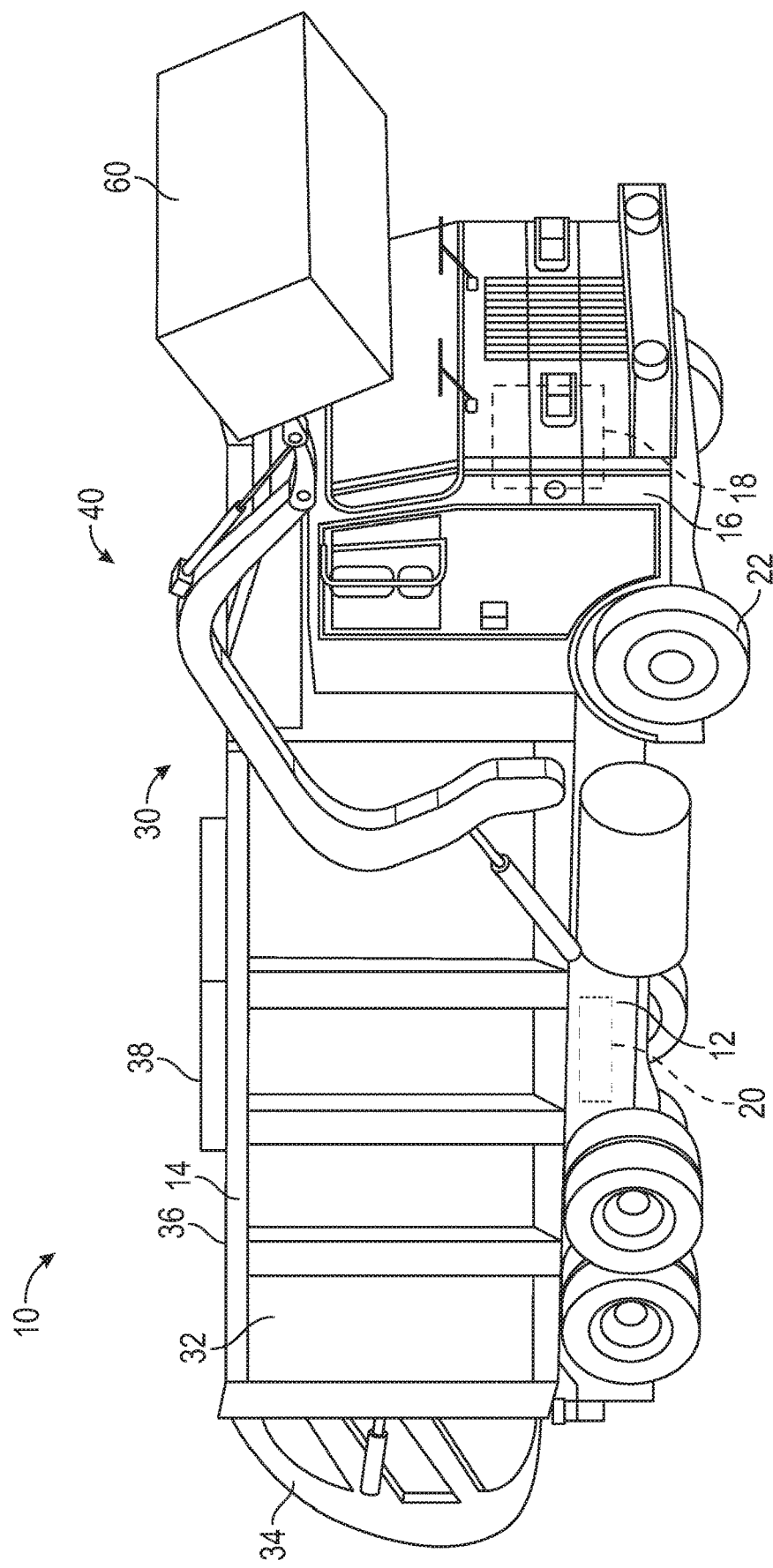
FIG. 1 is a perspective view of a refuse vehicle, according to an exemplary embodiment.
Figure 2:
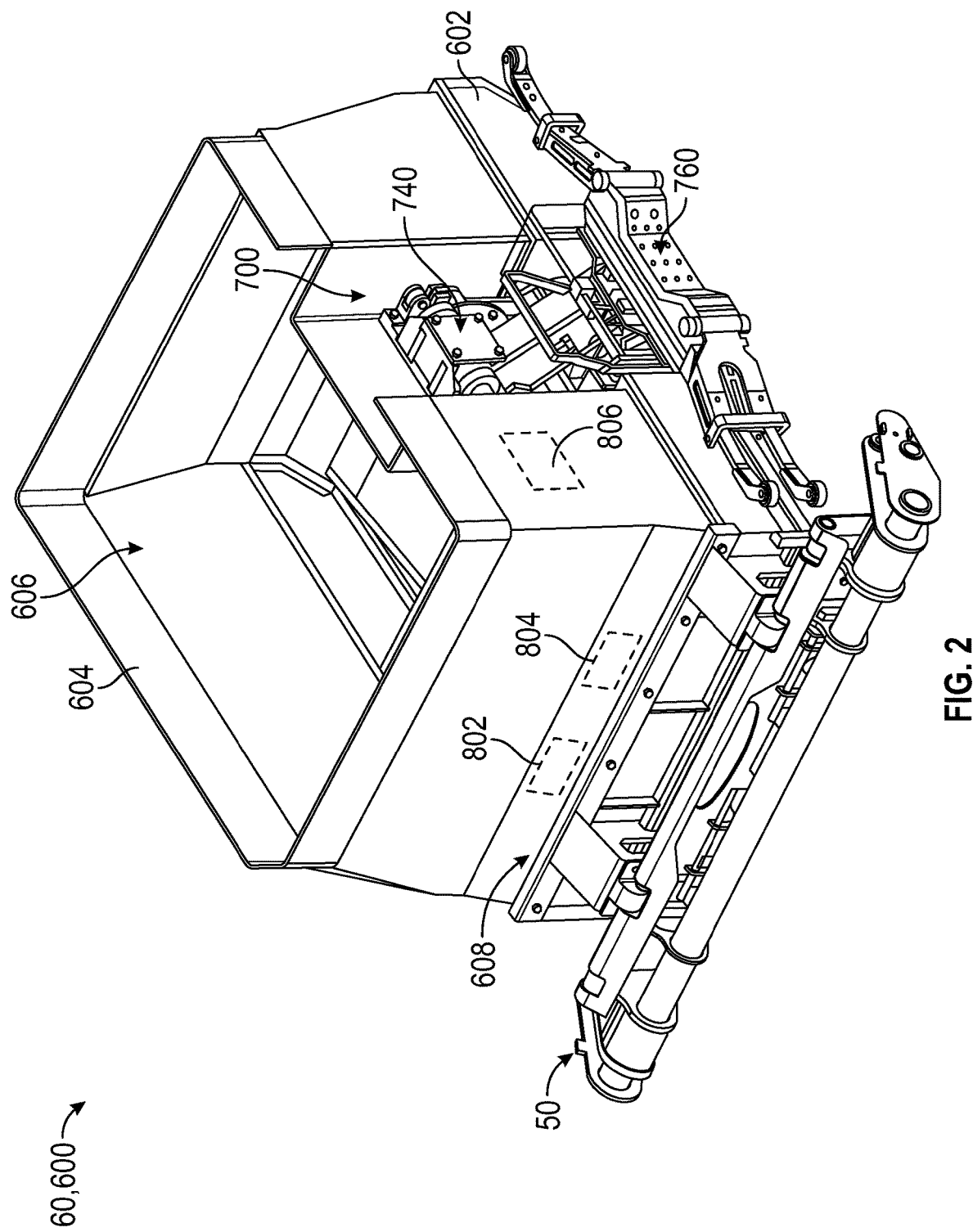
FIG. 2 is a perspective view of a carry can for the refuse vehicle of FIG. 1 having a robotic arm, according to an exemplary embodiment.
Figure 3:
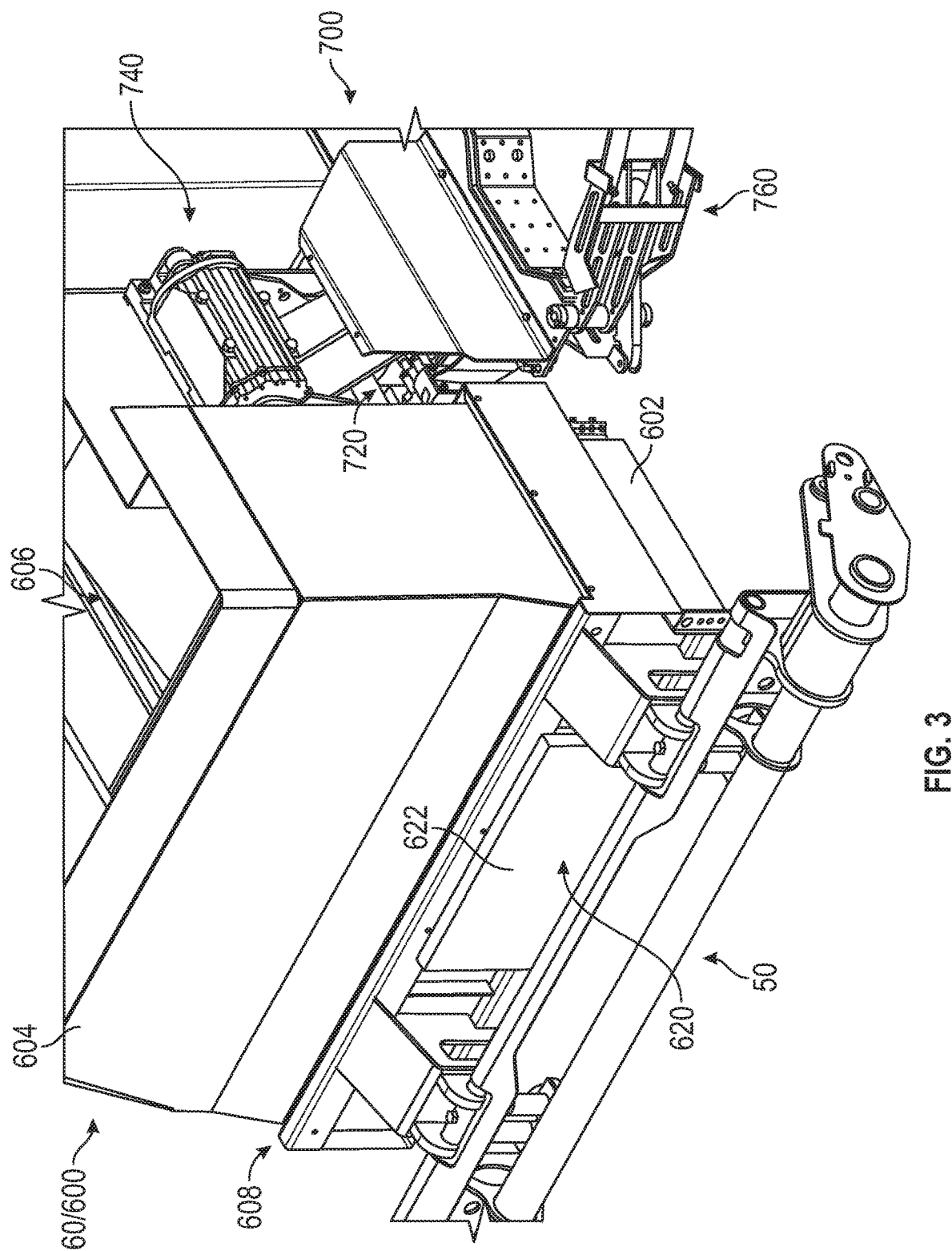
FIGS. 3-6 are various views of the carry can of FIG. 2 having an electric energy system, according to various exemplary embodiments.
Figure 4:
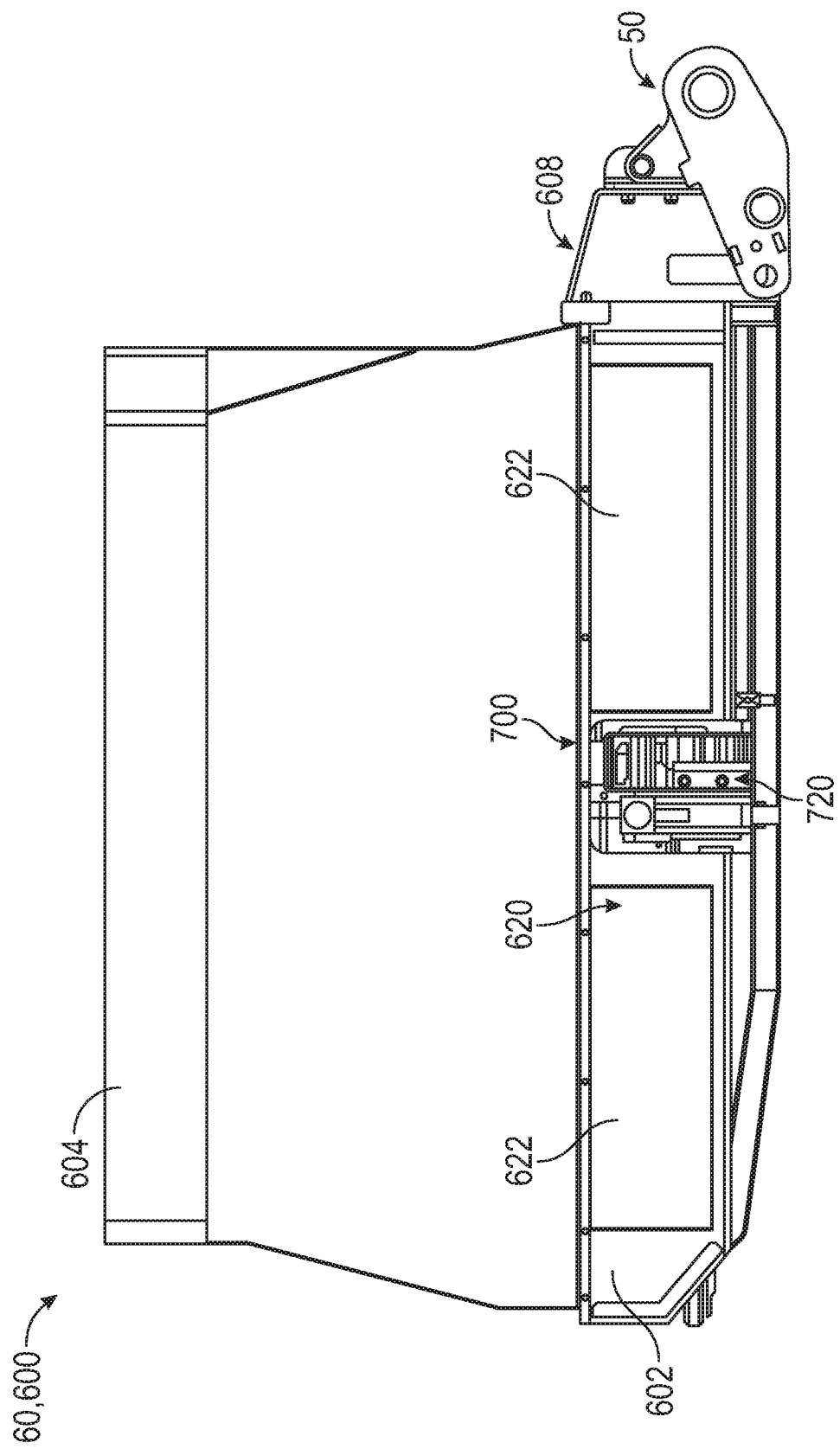
Figure 5:
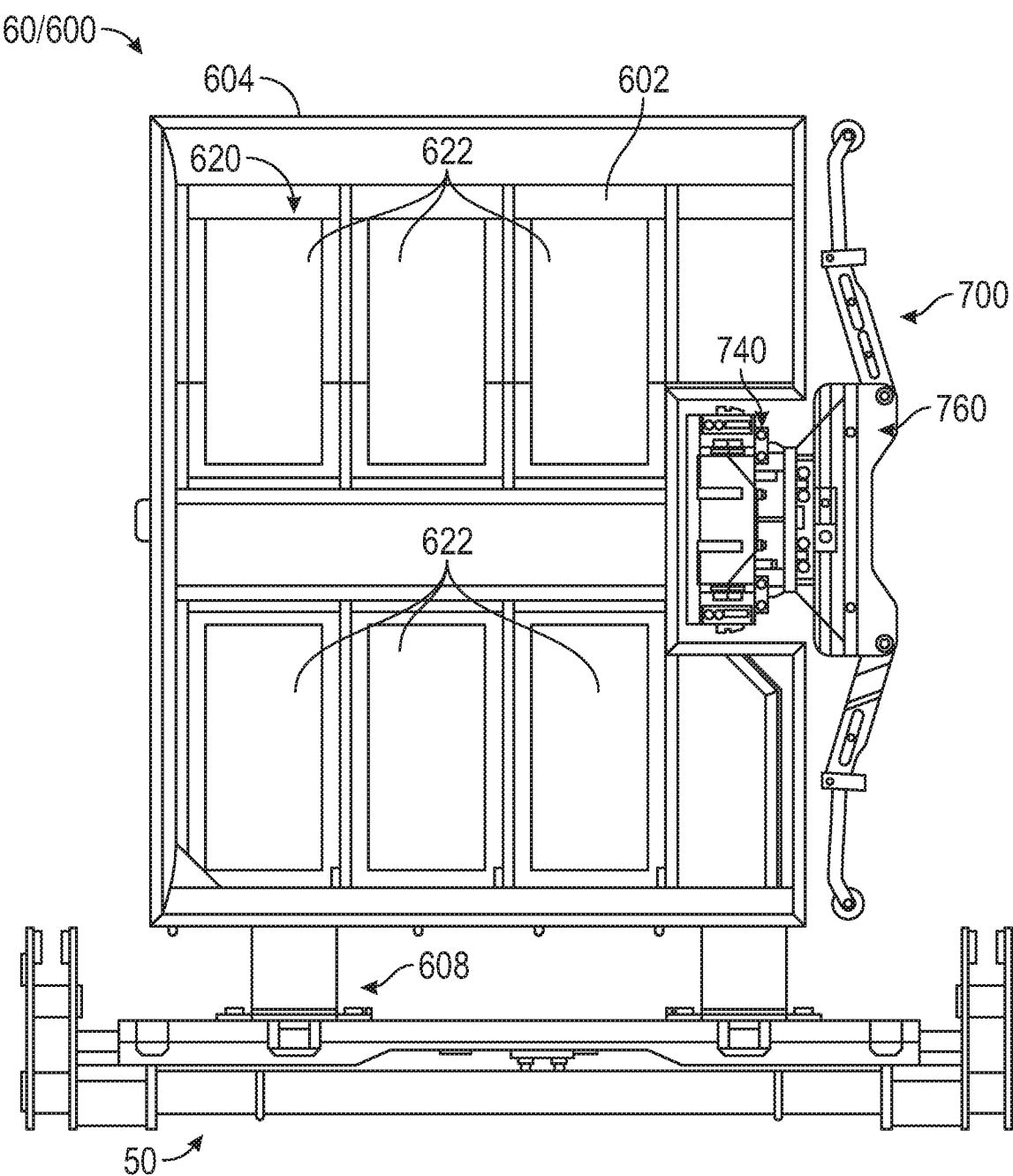
Figure 6:
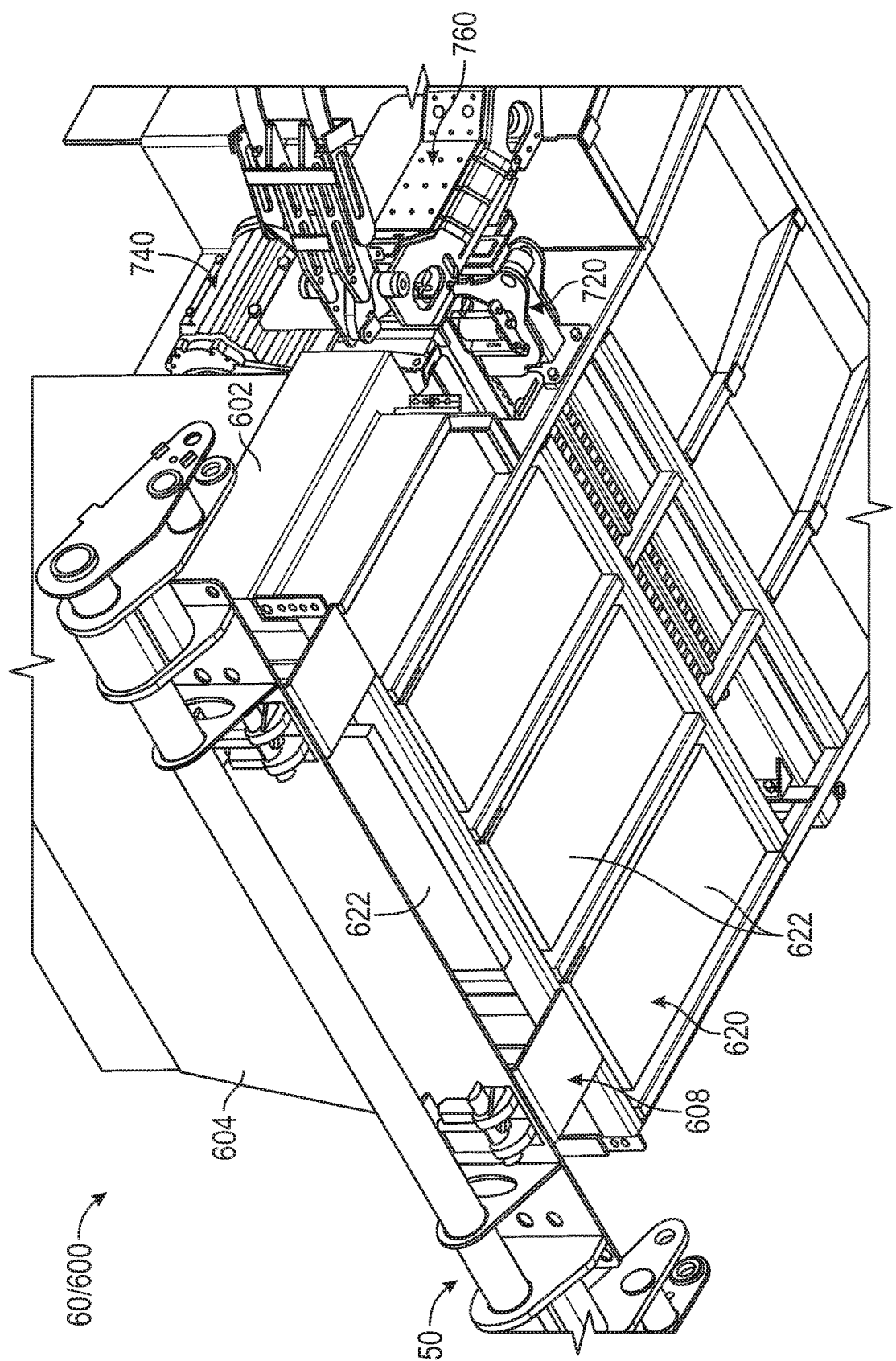

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes a prime mover, shown as electric motor 18, and an energy system, shown as energy storage and/or generation system 20. In other embodiments, the prime mover is or includes an internal combustion engine. According to the exemplary embodiment shown in FIG. 1, the electric motor 18 is coupled to the frame 12 at a position beneath the cab 16. The electric motor 18 is configured to provide power to a plurality of tractive elements, shown as wheels 22 (e.g., via a drive shaft, axles, etc.). In other embodiments, the electric motor 18 is otherwise positioned and/or the refuse vehicle 10 includes a plurality of electric motors to facilitate independently driving one or more of the wheels 22. In still other embodiments, the electric motor 18 or a secondary electric motor is coupled to and configured to drive a hydraulic system that powers hydraulic actuators. According to the exemplary embodiment shown in FIG. 1, the energy storage and/or generation system 20 is coupled to the frame 12 beneath the body 14. In other embodiments, the energy storage and/or generation system 20 is otherwise positioned (e.g., within a tailgate of the refuse vehicle 10, beneath the cab 16, along the top of the body 14, within the body 14, etc.).

According to an exemplary embodiment, the energy storage and/or generation system 20 is configured to (a) receive, generate, and/or store power and (b) provide electric power to (i) the electric motor 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). The energy storage and/or generation system 20 may include one or more rechargeable batteries (e.g., lithium-ion batteries, nickel-metal hydride batteries, lithium-ion polymer batteries, lead-acid batteries, nickel-cadmium batteries, etc.), capacitors, solar cells, generators, power buses, etc. In one embodiment, the refuse vehicle 10 is a completely electric refuse vehicle. In other embodiments, the refuse vehicle 10 includes an internal combustion generator that utilizes one or more fuels (e.g., gasoline, diesel, propane, natural gas, hydrogen, etc.) to generate electricity to charge the energy storage and/or generation system 20, power the electric motor 18, power the electric actuators, and/or power the other electrically operated accessories (e.g., a hybrid refuse vehicle, etc.). For example, the refuse vehicle 10 may have an internal combustion engine augmented by the electric motor 18 to cooperatively provide power to the wheels 22. The energy storage and/or generation system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10. In some embodiments, the energy storage and/or generation system 20 includes a heat management system (e.g., liquid cooling, heat exchanger, air cooling, etc.).

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.) to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Carry Can

According to the exemplary embodiment shown in FIGS. 2-28, the refuse container 60 is configured as a front-loader carry can, shown as carry can 600, that is configured to interface with the lift assembly 40 (e.g., a front-loading lift assembly, etc.) of the refuse vehicle 10. As shown in FIGS. 2-28, the carry can 600 includes a second energy system, shown as can energy storage and/or generation system 620, and an articulating collection arm, shown as robotic arm 700. In some embodiments, the can energy storage and/or generation system 620 powers the robotic arm 700. In some embodiments, the carry can 600 does not includes the can energy storage and/or generation system 620. In such embodiments, the energy storage and/or generation system 20 of the refuse vehicle 10 may power the robotic arm 700. Further details regarding the interaction between the energy storage and/or generation system 20, the can energy storage and/or generation system 620, and/or the robotic arm 700 is provided herein with respect to FIGS. 7-9.

As shown in FIGS. 2-6, the carry can 600 includes a refuse container having a base portion, shown as base 602, and peripheral sidewall, shown as container walls 604, extending from the base 602. The base 602 and the container walls 604 cooperatively define an internal cavity, shown as container refuse compartment 606. As shown in FIGS. 2-6, the carry can 600 includes an interface (e.g., a quick attach interface, etc.), shown as lift assembly interface 608, (i) that is positioned along a rear wall of the base 602 and (ii) that is configured to releasably interface with a coupling assembly, shown as quick attach assembly 50. According to an exemplary embodiment, the quick attach assembly 50 is configured to couple to the lift assembly 40 to facilitate lifting the carry can 600 with the lift assembly 40 to empty contents within the container refuse compartment 606 into the refuse compartment 30 of the refuse vehicle 10. Additional disclosure regarding the lift assembly interface 608 and the quick attach assembly 50 may be found in (i) U.S. Pat. No. 10,035,648, filed May 31, 2017, (ii) U.S. Pat. No. 10,351,340, filed Jul. 27, 2018, (iii) U.S. Pat. No. 10,513,392, filed May 16, 2019, and (iv) U.S. Patent Publication No. 2020/0087063, filed Nov. 21, 2019, all of which are incorporated herein by reference in their entireties. In other embodiments, the base 602 and/or the container walls 604 define fork pockets that selectively receive and interface with forks of the lift assembly 40 to facilitate coupling the carry can 600 to the lift assembly 40.

According to an exemplary embodiment, the can energy storage and/or generation system 620 is configured to (a) receive, generate, and/or store power and (b) provide electric power to the robotic arm 700 to facilitate operation thereof. As shown in FIGS. 3-6, the can energy storage and/or generation system 620 includes a plurality of battery cells, shown as batteries 622, positioned within the base 602 and/or along an exterior (e.g., a rear portion, a side portion, a bottom portion, a front portion, etc.) of the carry can 600. In some embodiments, the batteries 622 are additionally or alternatively positioned within the container walls 604, positioned along an exterior of the container walls 604, and/or still otherwise positioned on and/or within the carry can 600 (e.g., along/within a rear wall, along/within a sidewall, along/within a front wall, etc.). In some embodiments, the batteries 622 are selectively swappable (e.g., to facilitate quickly replenishing the charge level of the can energy storage and/or generation system 620, etc.). The batteries 622 may include one or more rechargeable batteries (e.g., lithium-ion batteries, nickel-metal hydride batteries, lithium-ion polymer batteries, lead-acid batteries, nickel-cadmium batteries, etc.). In some embodiments, the can energy storage and/or generation system 620 additionally or alternatively includes capacitors, solar cells, generators, power buses, etc.

Figure 7:
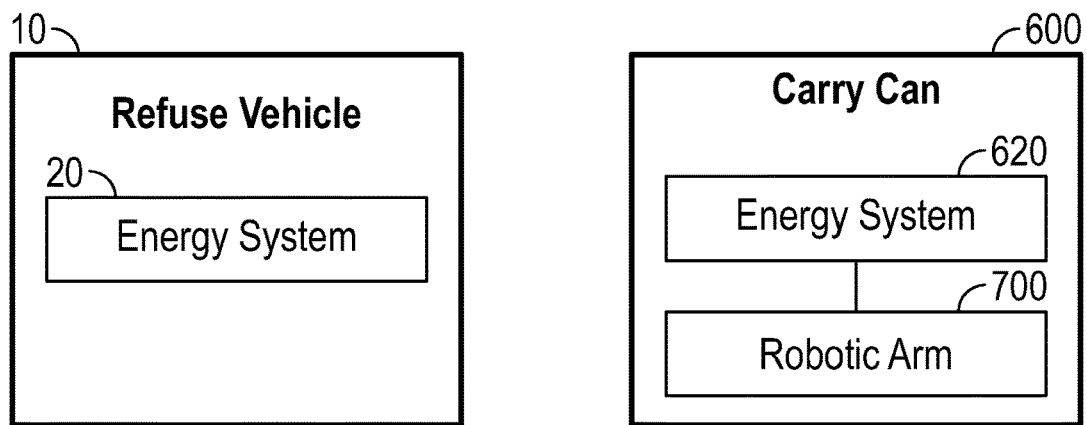
FIGS. 7-9 are various schematic diagrams of the refuse vehicle of FIG. 1 and the carry can of FIG. 2, according to various exemplary embodiments.
Figure 8:
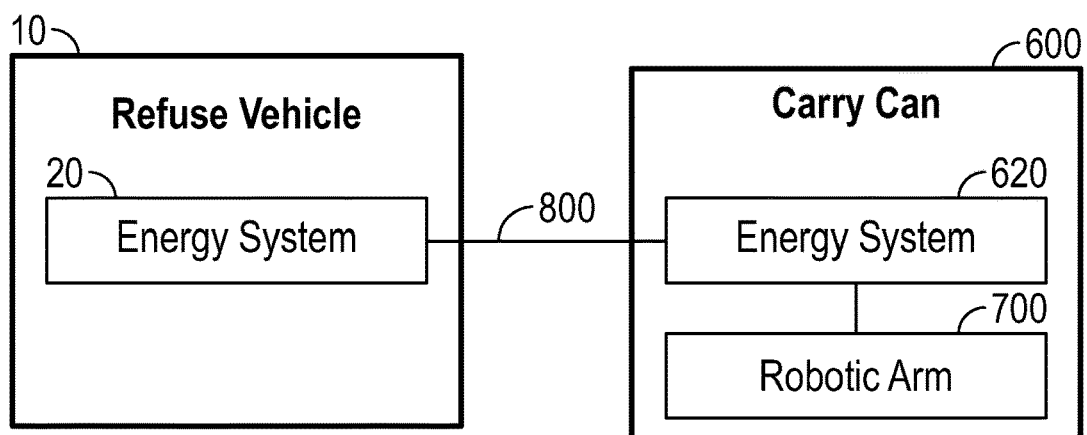
Figure 9:
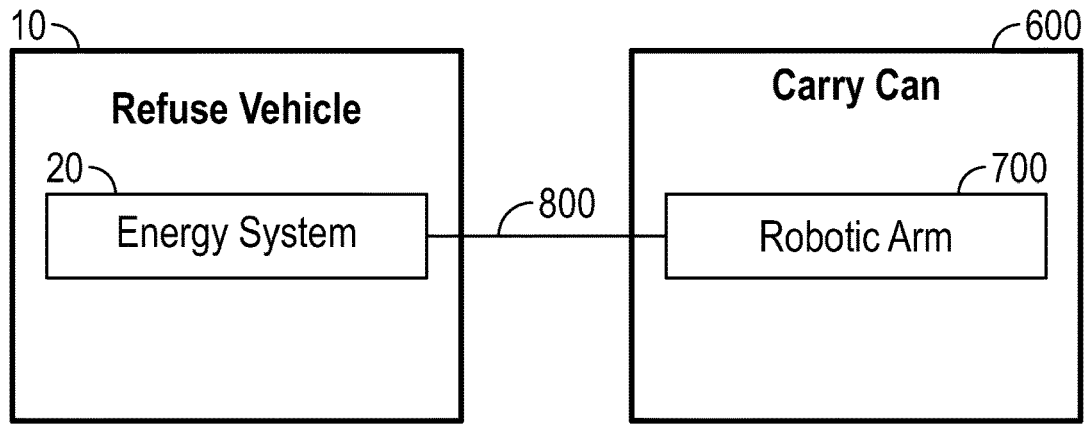
Figure 10:
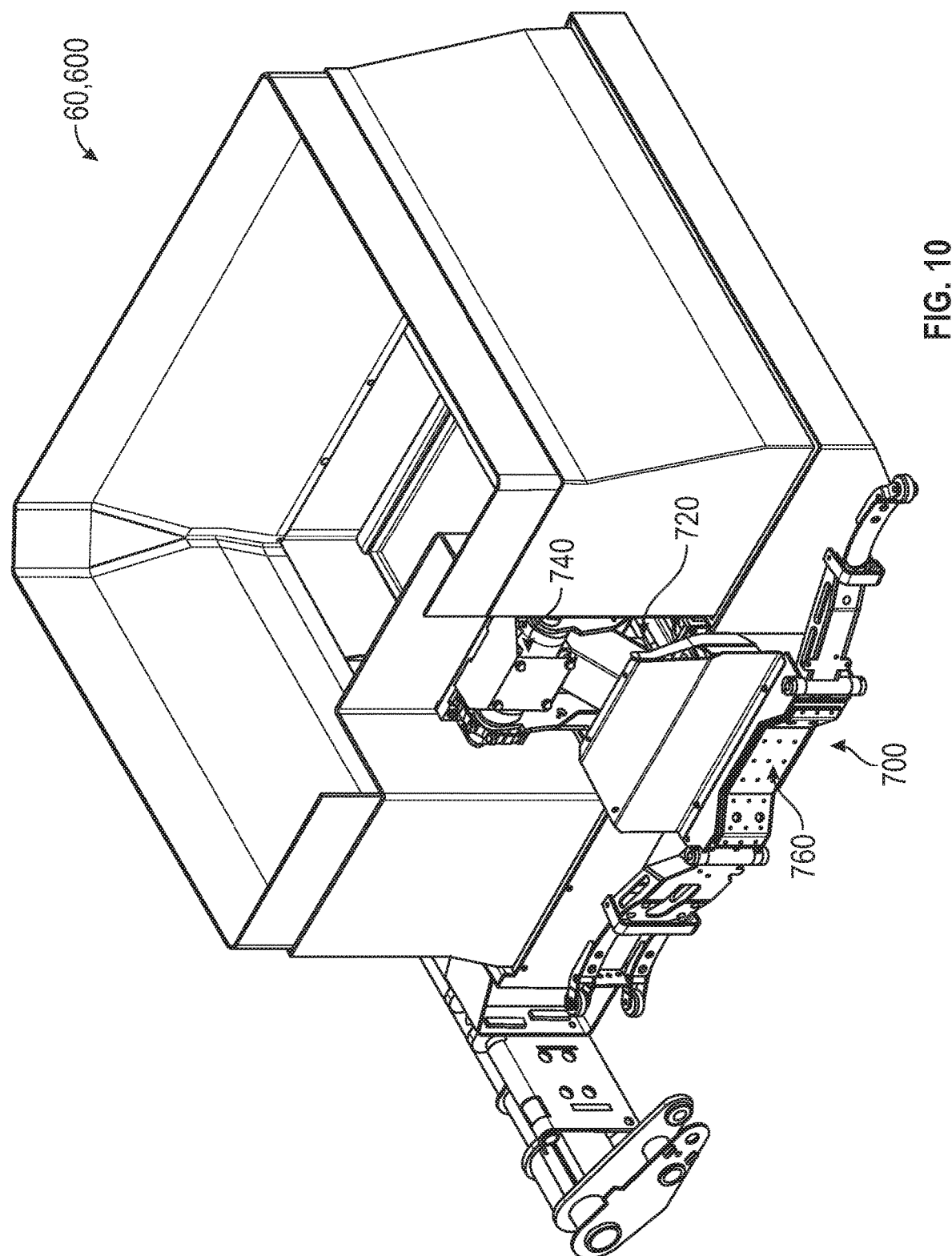
FIG. 10 is a perspective view of the carry can of FIG. 2 with the robotic arm in a nominal, non-extended position, according to an exemplary embodiment.

In some embodiments, the can energy storage and/or generation system 620 has an independent charging or power interface 802, separate from the energy storage and/or generation system 20 of the refuse vehicle 10. In some embodiments, the energy storage and/or generation system 20 and the can energy storage and/or generation system 620 are charged through a single, common charging interface. In some embodiments, the energy storage and/or generation system 20 charges the can energy storage and/or generation system 620 (e.g., via the power interface 802 of the carry can 600, etc.). As shown in FIG. 7, the can energy storage and/or generation system 620 is completely separate from and independent of the energy storage and/or generation system 20 of the refuse vehicle 10 and, therefore, can operate the robotic arm 700 without receiving power from energy storage and/or generation system 20 of the refuse vehicle 10. In such an embodiment, the refuse vehicle 10 may be a traditional, internal-combustion engine driven refuse vehicle, a hybrid refuse vehicle, or a full-electric refuse vehicle. As shown in FIG. 8, the can energy storage and/or generation system 620 is coupled to the energy storage and/or generation system 20 of the refuse vehicle 10. In such an embodiment, the energy storage and/or generation system 20 may at least partially charge the can energy storage and/or generation system 620 to facilitate operating the robotic arm 700 (e.g., via the power interface 802 of the carry can 600, etc.). By way of example, the energy storage and/or generation system 20 may be configured to trickle charge the can energy storage and/or generation system 620 (e.g., in between load pickups, etc.). In such an example, the size of the can energy storage and/or generation system 620 may be reduced, as large battery capacity may not be necessary, and lower amperage wire between the energy storage and/or generation system 20 and the can energy storage and/or generation system 620 may be used. As shown in FIG. 9, the carry can 600 does not include the can energy storage and/or generation system 620, but rather the energy storage and/or generation system 20 of the refuse vehicle 10 is directly coupled to and facilitates operation of the robotic arm 700 (e.g., via the power interface 802 of the carry can 600, etc.).

As shown in FIGS. 2-6 and 10-28, the robotic arm 700 is positioned along and selectively extends outward from a sidewall of the container walls 604 of the carry can 600. In other embodiments, at least a portion of the robotic arm 700 is coupled to and translates along a rear wall of the container walls 604 of the carry can 600. As shown in FIGS. 2-6 and 10-28, the robotic arm 700 includes an first assembly, shown as extension mechanism 720; a second assembly, shown as lift mechanism 740, coupled to the extension mechanism 720; and a third assembly, shown as grabber mechanism 760, coupled to the lift mechanism 740.

Figure 11:
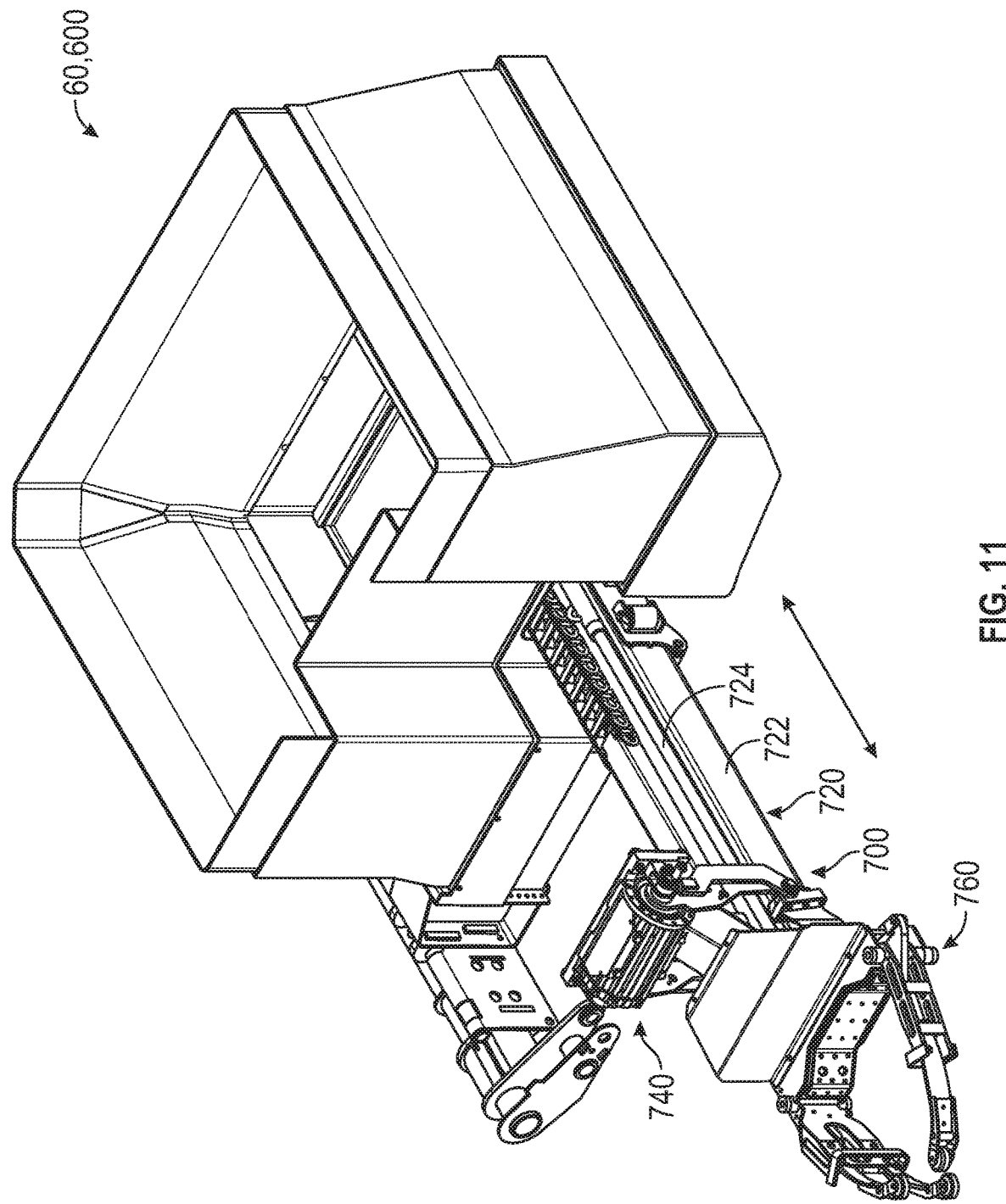
FIG. 11 is a perspective view of the carry can of FIG. 10 with the robotic arm in an extended position, according to an exemplary embodiment.

As shown in FIGS. 10-15, the extension mechanism 720 includes a extenable/telescoping arm, shown as can arm 722, and a first actuator, shown as extension actuator 724, positioned to facilitate selectively extending and retracting the can arm 722 and, thereby, the lift mechanism 740 and the grabber mechanism 760 between a nominal, non-extended position (see, e.g., FIG. 10) and an extended position (see, e.g., FIG. 11). According to an exemplary embodiment, the extension actuator 724 is an electric actuator configured to be powered via electricity provided by the energy storage and/or generation system 20, the can energy storage and/or generation system 620, and/or another electrical source on the refuse vehicle 10 and/or the carry can 600 (e.g., a generator, solar panels, etc.). In an alternative embodiment, the extension actuator 724 is a fluidly operated actuator (e.g., a hydraulic cylinder, a pneumatic cylinder, etc.) operated by a fluid pump (e.g., a hydraulic pump, a pneumatic pump, etc.) driven by an electric motor (e.g., the electric motor 18, the secondary electric motor, an integrated motor of the fluid pump, etc.). In such an embodiment, the fluid pump may be positioned on the refuse vehicle 10 or on the carry can 600, and fluidly coupled to fluidly operated actuator via conduits.

Figure 12:
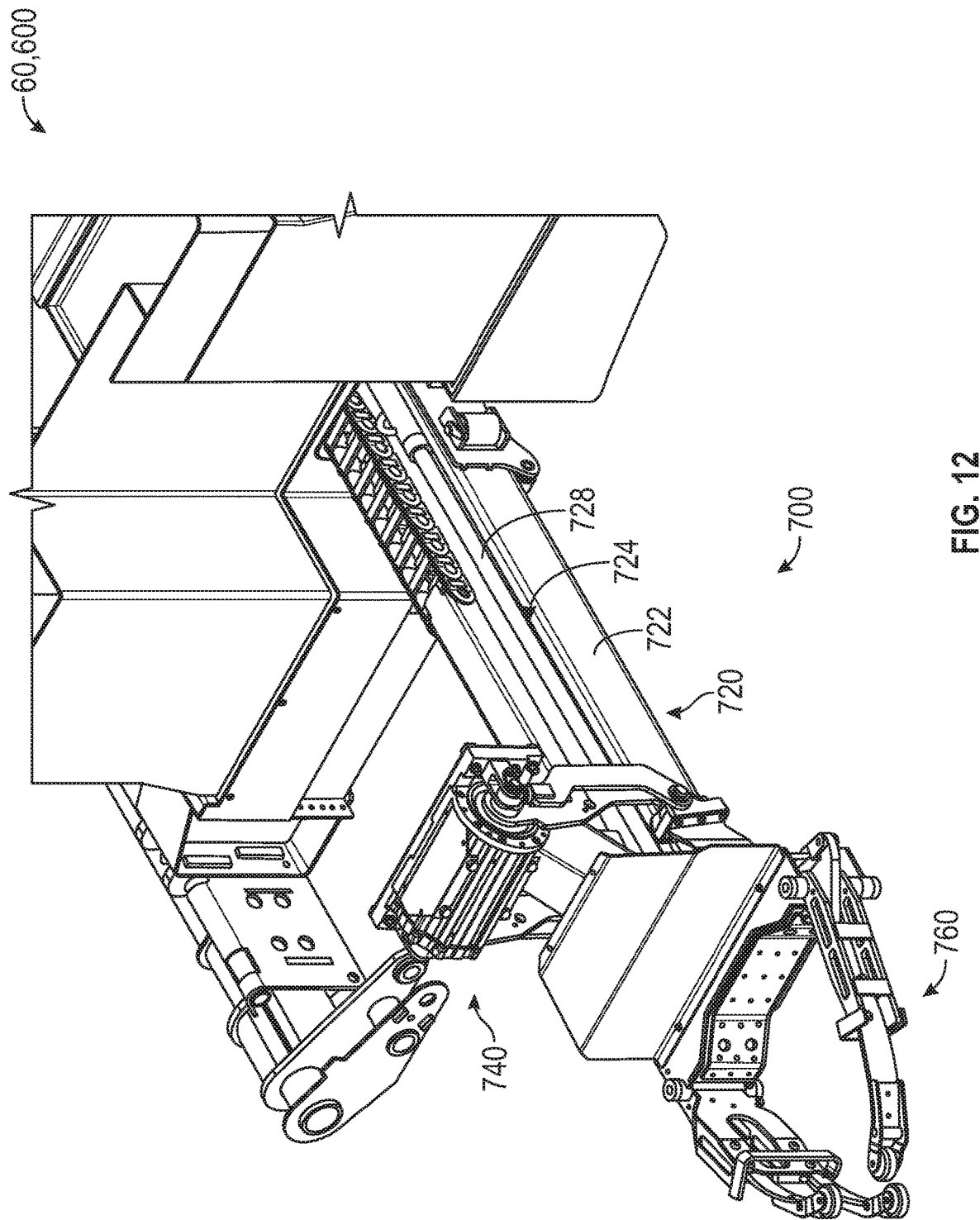
FIGS. 12 and 13 are perspective views of the robotic arm of FIG. 2 having an extension actuator configured to extend and retract the robotic arm between a nominal, non-extended position and an extended position, according to an exemplary embodiment.
Figure 13:
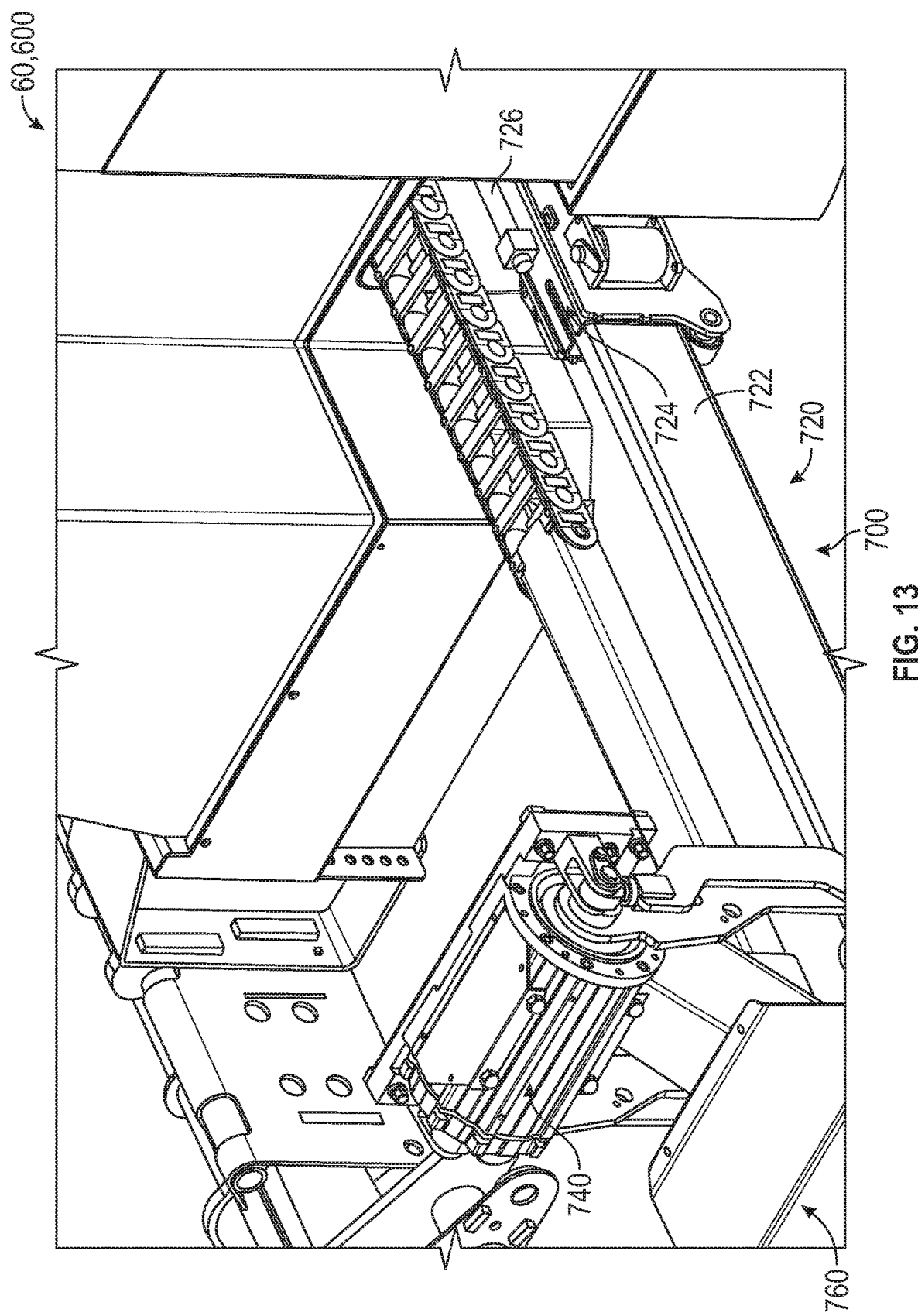
Figure 14:
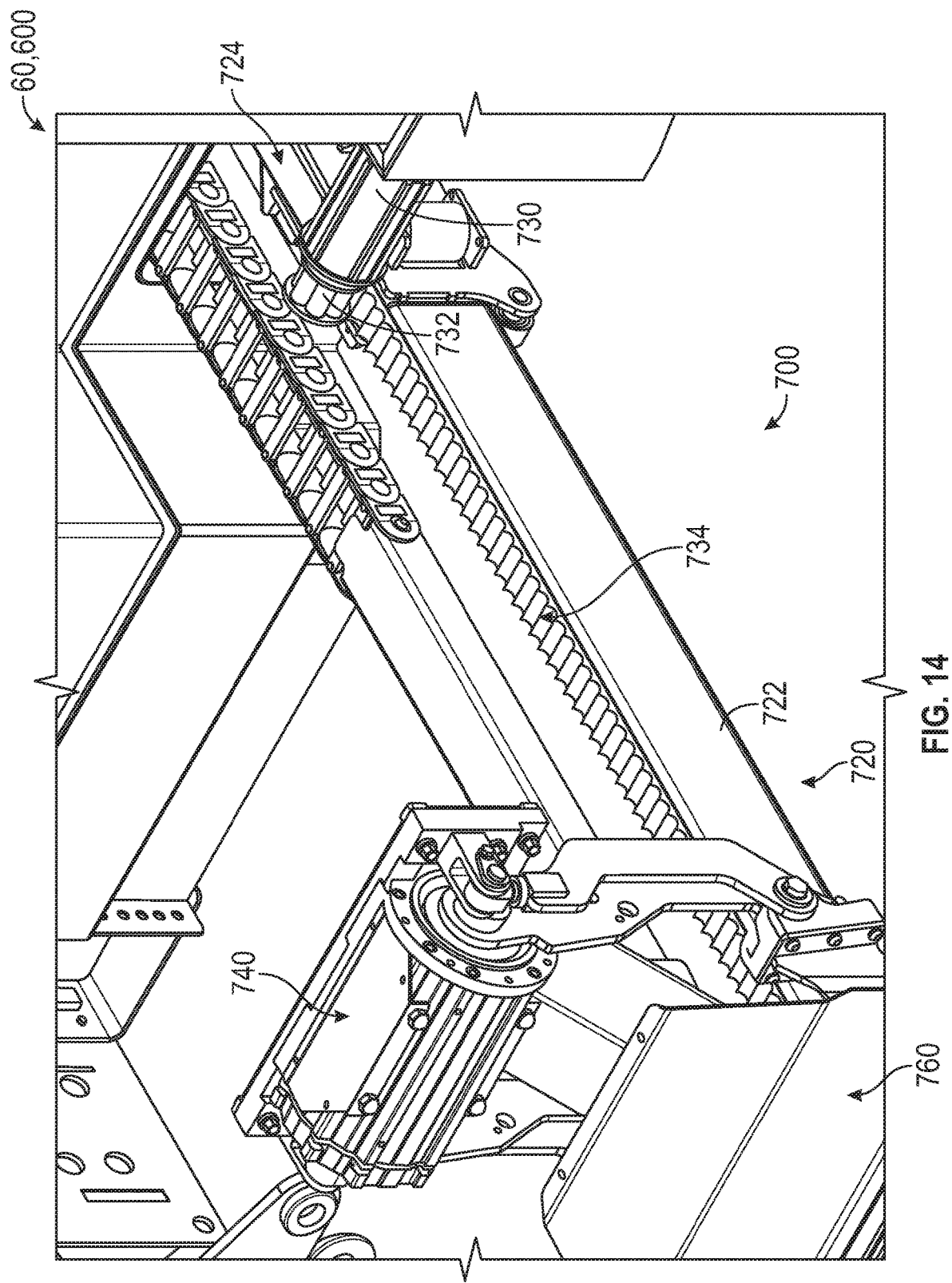
FIG. 14 is perspective view of the robotic arm of FIG. 2 having an extension actuator configured to extend and retract the robotic arm between a nominal, non-extended position and an extended position, according to another exemplary embodiment.

According to the exemplary embodiment shown in FIGS. 12 and 13, the extension actuator 724 is a linear actuator configured to extend and retract to extend and retract the can arm 722. As shown in FIGS. 12 and 14, the extension actuator 724 includes a ball screw 726 coupled to a linear actuator 728. The ball screw 726 may be driven by an electric motor to extend and retract the linear actuator 728. In other embodiments, another type of electrically driven, linear actuator is used (e.g., a lead screw actuator, etc.).

Figure 15:
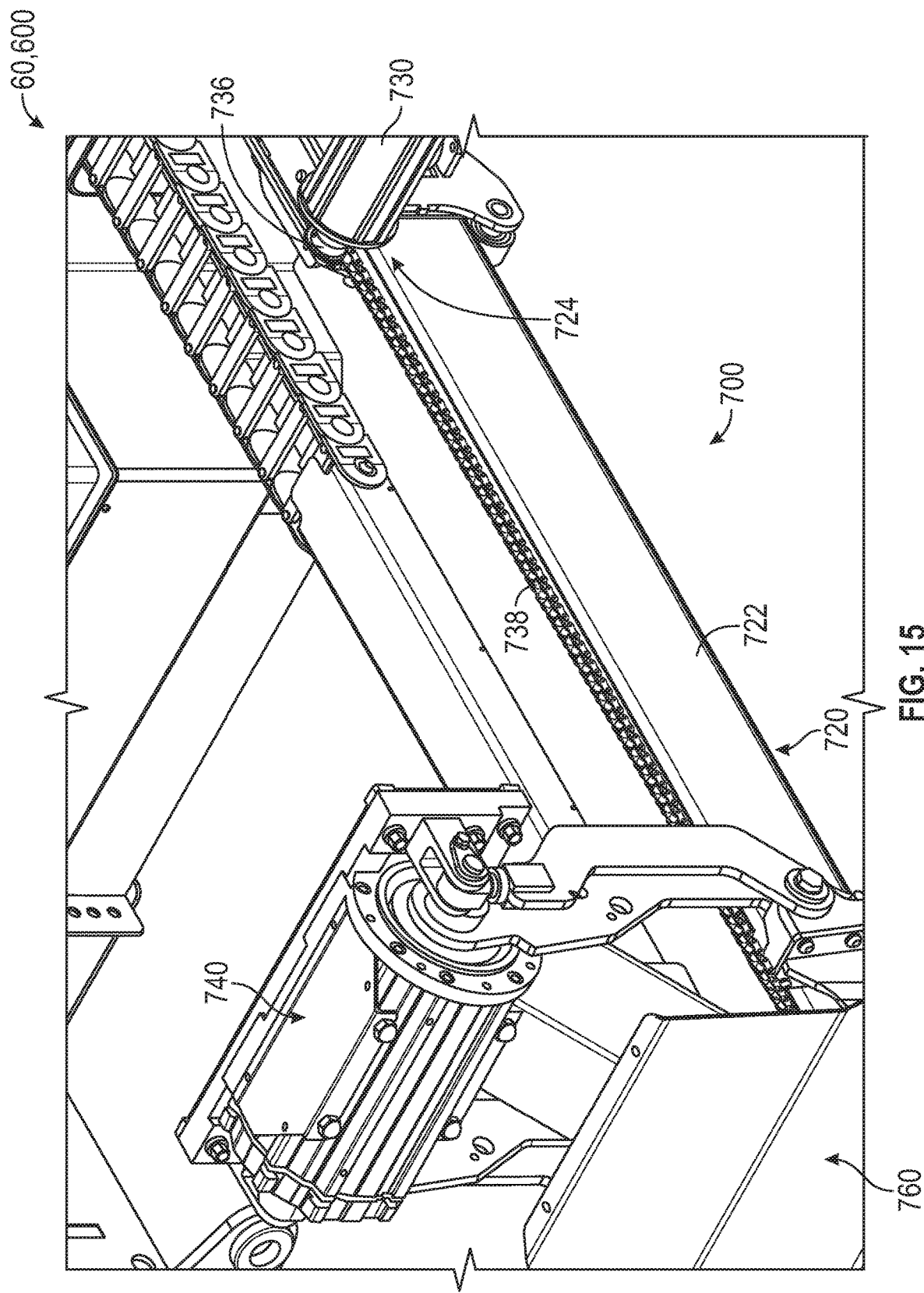
FIG. 15 is perspective view of the robotic arm of FIG. 2 having an extension actuator configured to extend and retract the robotic arm between a nominal, non-extended position and an extended position, according to still another exemplary embodiment.
Figure 16:
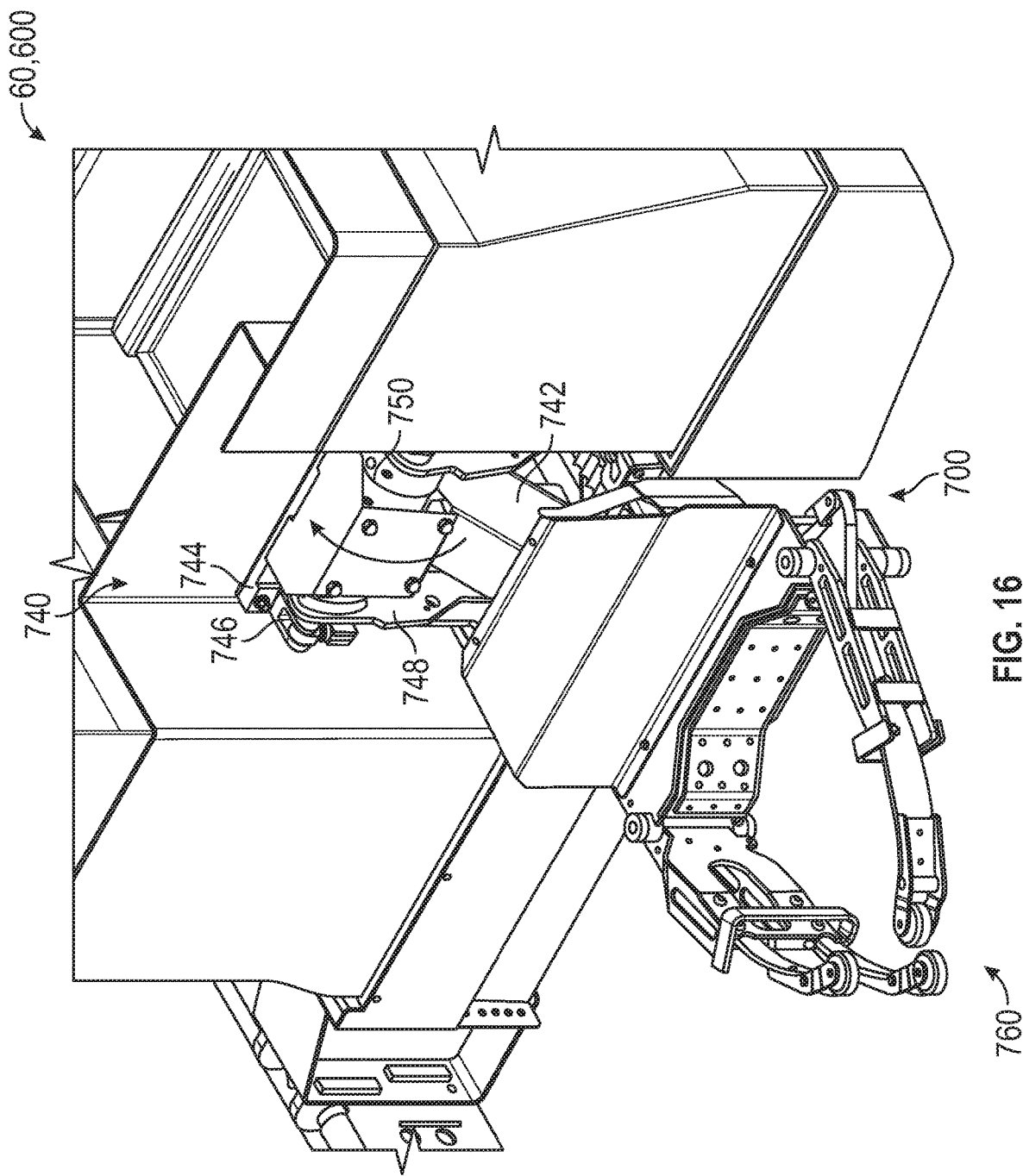
FIG. 16 is a perspective view of the carry can of FIG. 2 with a grabber mechanism of the robotic arm in a nominal, non-pivoted position, according to an exemplary embodiment.

According to the exemplary embodiment shown in FIGS. 14 and 15, the extension actuator 724 includes a rotational actuator, shown as motor 730, configured to extend and retract the can arm 722. As shown in FIG. 14, the motor 730 includes a first output, shown as rack pinion 732, positioned to interface with a rack, shown as arm rack 734, extending along the can arm 722. According to an exemplary embodiment, the rack pinion 732 engages with teeth of the arm rack 734 and is driven by the motor 730 to index the arm rack 734 and, thereby, extend and retract the can arm 722. In some embodiments, the rack pinion 732 is a geared pinion. In some embodiments, the rack pinion 732 is a roller pinion. As shown in FIG. 15, the motor 730 includes a second output, shown as chain pinion 736, positioned to interface with a chain, shown as push chain 738, extending along the can arm 722. According to an exemplary embodiment, the chain pinion 736 engages with gaps in the push chain 738 and is driven by the motor 730 to index the push chain 738 and, thereby, extend and retract the can arm 722.

Figure 17:
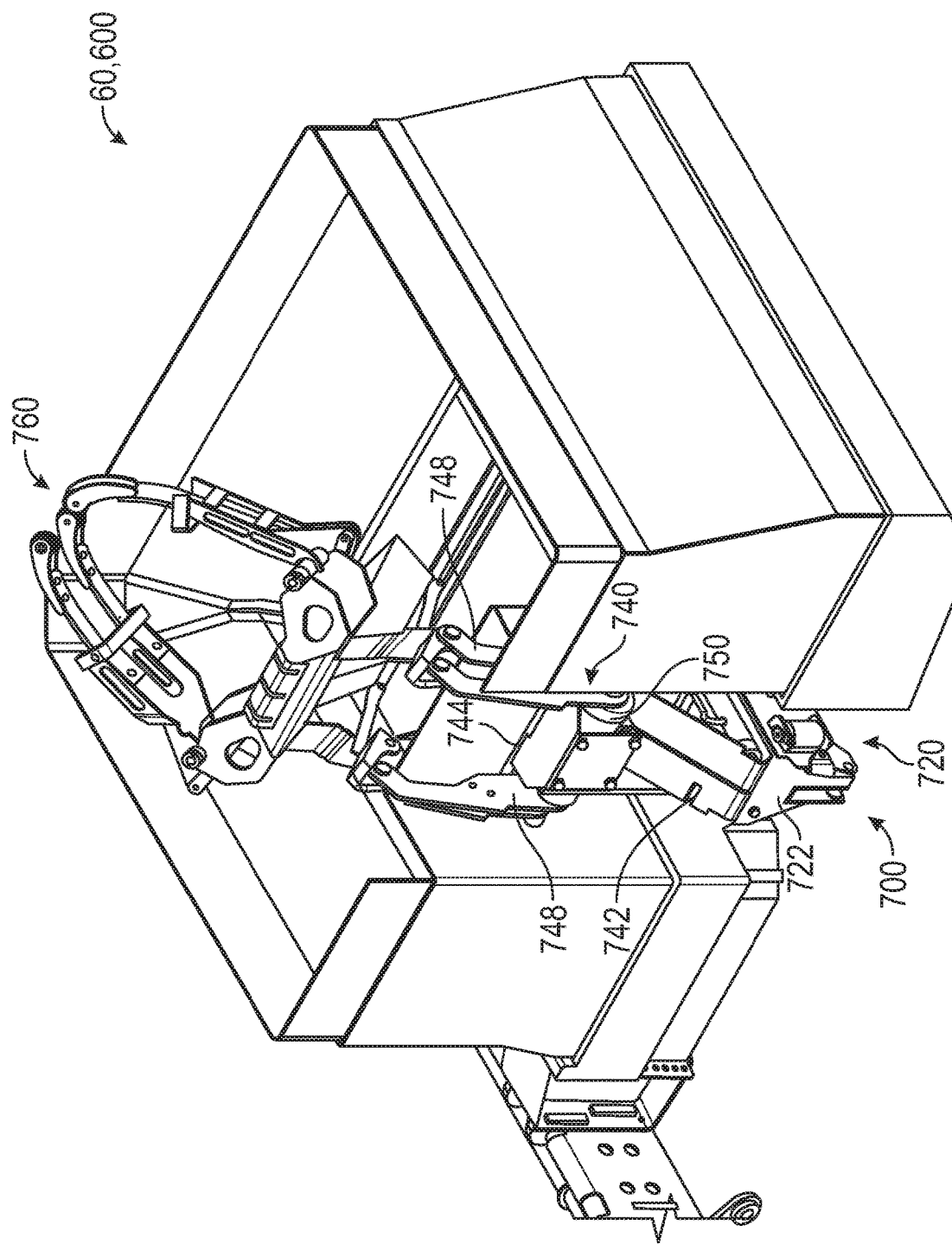
FIG. 17 is a perspective view of the carry can of FIG. 16 with the grabber mechanism of the robotic arm in a pivoted position, according to an exemplary embodiment.

As shown in FIGS. 16-19, the lift mechanism 740 includes an extension, shown as support 742, coupled to an end of the can arm 722 and extending upward and/or at an angle therefrom; a base, shown as base plate 744, coupled to an end of the support 742, opposite the can arm 722; one or more interfaces, shown as hinges 746, positioned at opposing sides of and protruding from the base plate 744; one or more arms, shown as lift arms 748, pivotally coupled to and extending between the hinges 746 and the grabber mechanism 760; and a second actuator, shown as lift actuator 750, positioned to facilitate selectively pivoting the lift arms 748 and, thereby, the grabber mechanism 760 about a first axis, shown as pivot axis 752, between a nominal, non-pivoted position (see, e.g., FIG. 16) and a pivoted position (see, e.g., FIG. 17). According to an exemplary embodiment, the lift actuator 750 is an electric actuator (e.g., an electric motor, etc.) configured to be powered via electricity provided by the energy storage and/or generation system 20, the can energy storage and/or generation system 620, and/or another electrical source on the refuse vehicle 10 and/or the carry can 600 (e.g., a generator, solar panels, etc.). In some embodiments, the lift actuator 750 is a rotational electric actuator (e.g., an electric motor, etc.). In other embodiments, the lift actuator 750 is a linear electric actuator. In an alternative embodiment, the lift actuator 750 is a fluidly operated actuator (e.g., a hydraulic cylinder, a hydraulic rotary actuator, a pneumatic cylinder, a pneumatic rotary vane, etc.) operated by a fluid pump (e.g., a hydraulic pump, a pneumatic pump, etc.) driven by an electric motor (e.g., the electric motor 18, the secondary electric motor, an integrated motor of the fluid pump, etc.). In such an embodiment, the fluid pump may be positioned on the refuse vehicle 10 or on the carry can 600, and fluidly coupled to fluidly operated actuator via conduits.

Figure 18:
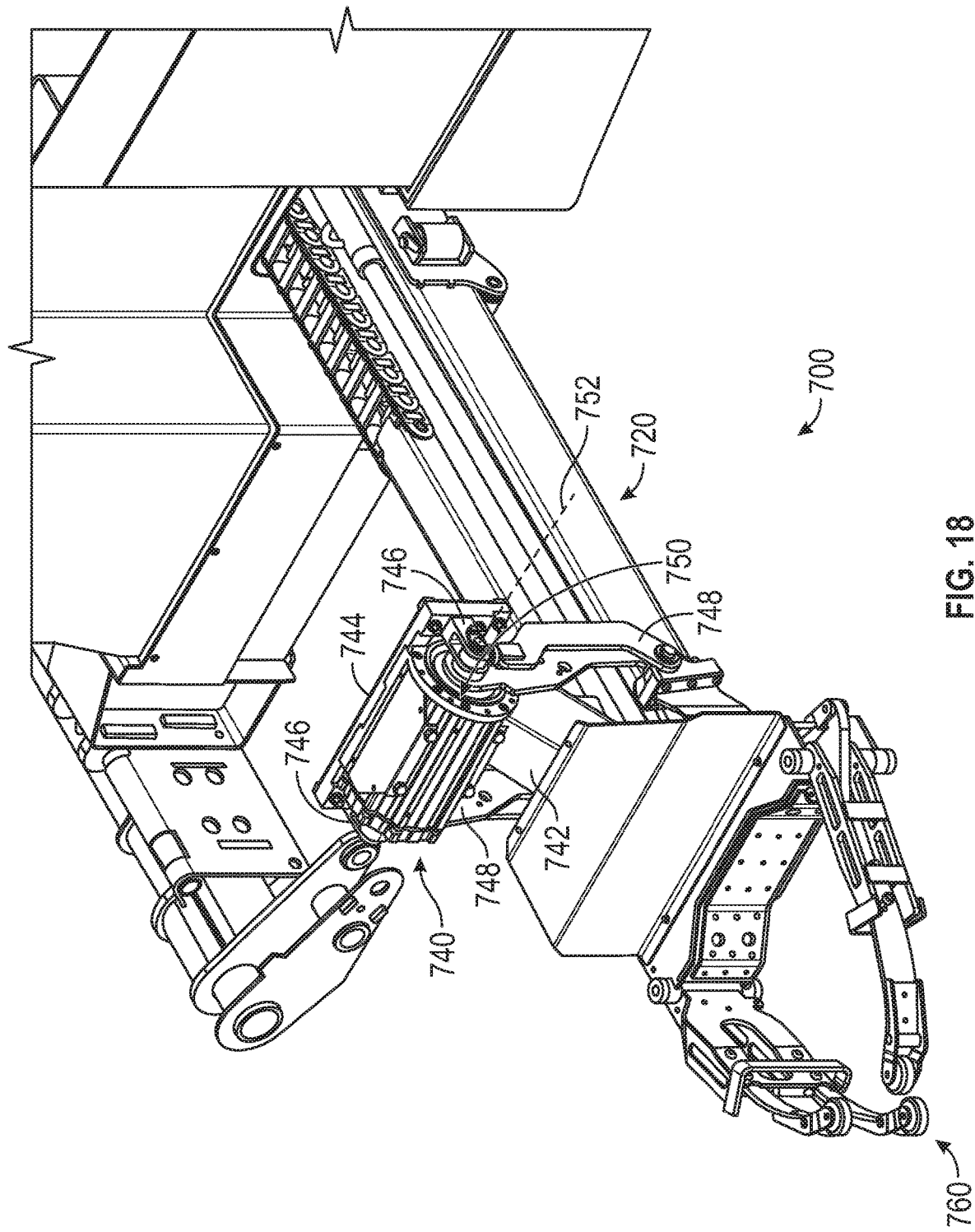
FIG. 18 is perspective view of the robotic arm of FIG. 2 having a lift actuator configured to pivot a grabber mechanism of the robotic arm between a nominal, non-pivoted position and a pivoted position, according to an exemplary embodiment.

As shown in FIG. 18, the lift actuator 750 is coupled to the base plate 744 and disposed along the pivot axis 752 (e.g., an in-line arrangement, etc.). According to the exemplary embodiment shown in FIG. 18, the lift actuator 750 extends directly between the lift arms 748 and the hinges 746 such the lift actuator 750 directly drives the motion of the lift arms 748. In other embodiments, a first transmission device or an inline transmission device is positioned between the lift actuator 750 and at least one of the lift arms 748 such the lift actuator 750 drives the motion of the lift arms 748 through the inline transmission device. By way of example, the inline transmission device may be a gearbox (e.g., a planetary gearbox, etc.). By way of another example, the inline transmission device may be a cycloidal drive. By way of still another example, the inline transmission device may be a harmonic drive.

Figure 19:
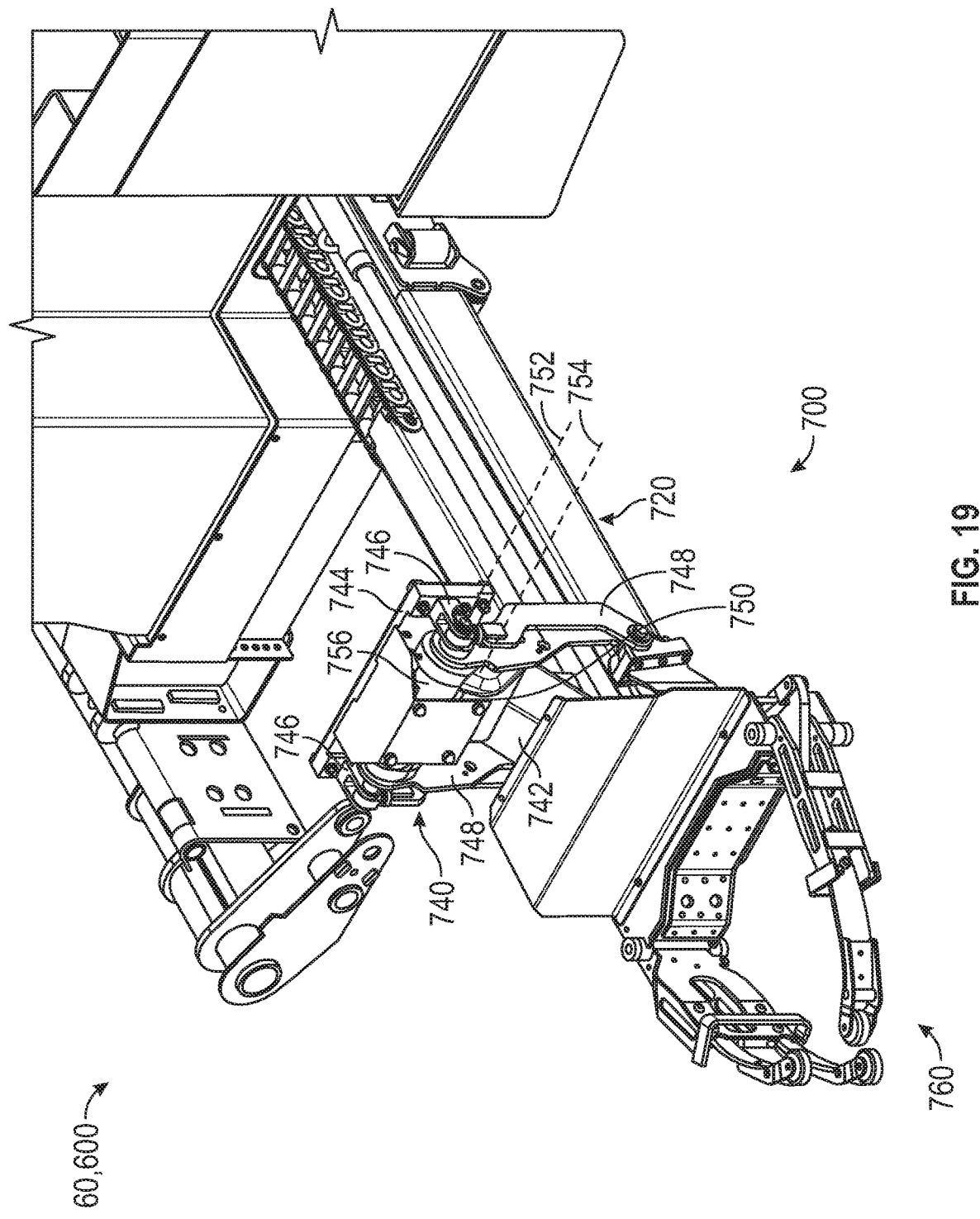
FIG. 19 is perspective view of the robotic arm of FIG. 2 having a lift actuator configured to pivot a grabber mechanism of the robotic arm between a nominal, non-pivoted position and a pivoted position, according to another exemplary embodiment.
Figure 20:
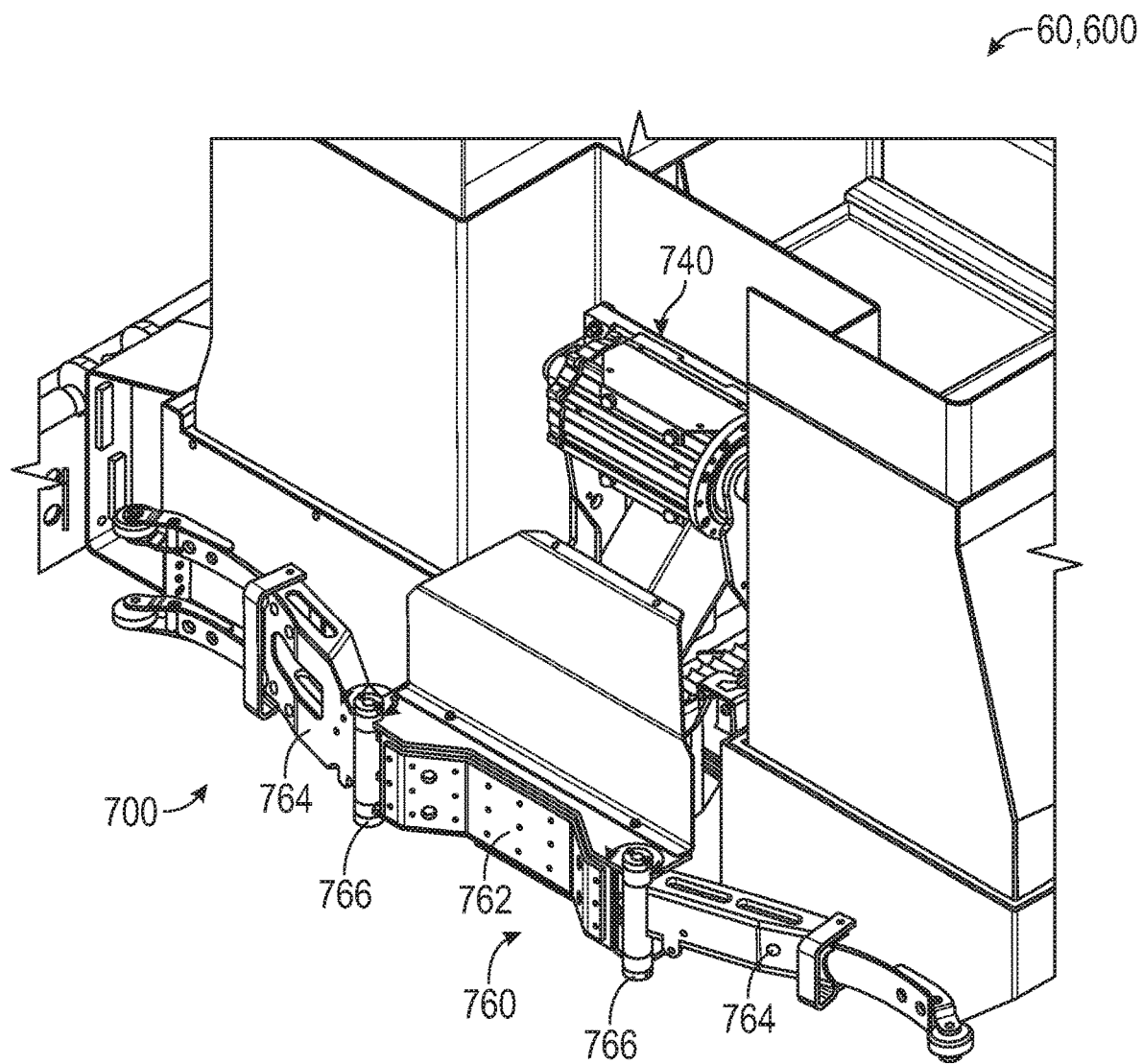
FIG. 20 is a perspective view of the carry can of FIG. 2 with a grabber mechanism of the robotic arm in a nominal, open arrangement, according to an exemplary embodiment.

As shown in FIG. 19, the lift actuator 750 is coupled to the base plate 744 and positioned offset from the pivot axis 752 along a second axis, shown as offset axis 754, that is parallel to the pivot axis 752 (e.g., a parallel arrangement, etc.). The lift actuator 750, therefore, is indirectly coupled to the lift arms 748 through a second transmission device, shown as offset transmission device 756, such the lift actuator 750 drives the motion of the lift arms 748 through the offset transmission device 756. By way of example, the offset transmission device 756 may be a gearbox (e.g., eccentric gearing, parallel axis gearing, a double-reduction worm gear assembly, etc.). By way of another example, the offset transmission device 756 may be a chain assembly or a belt assembly.

Figure 21:
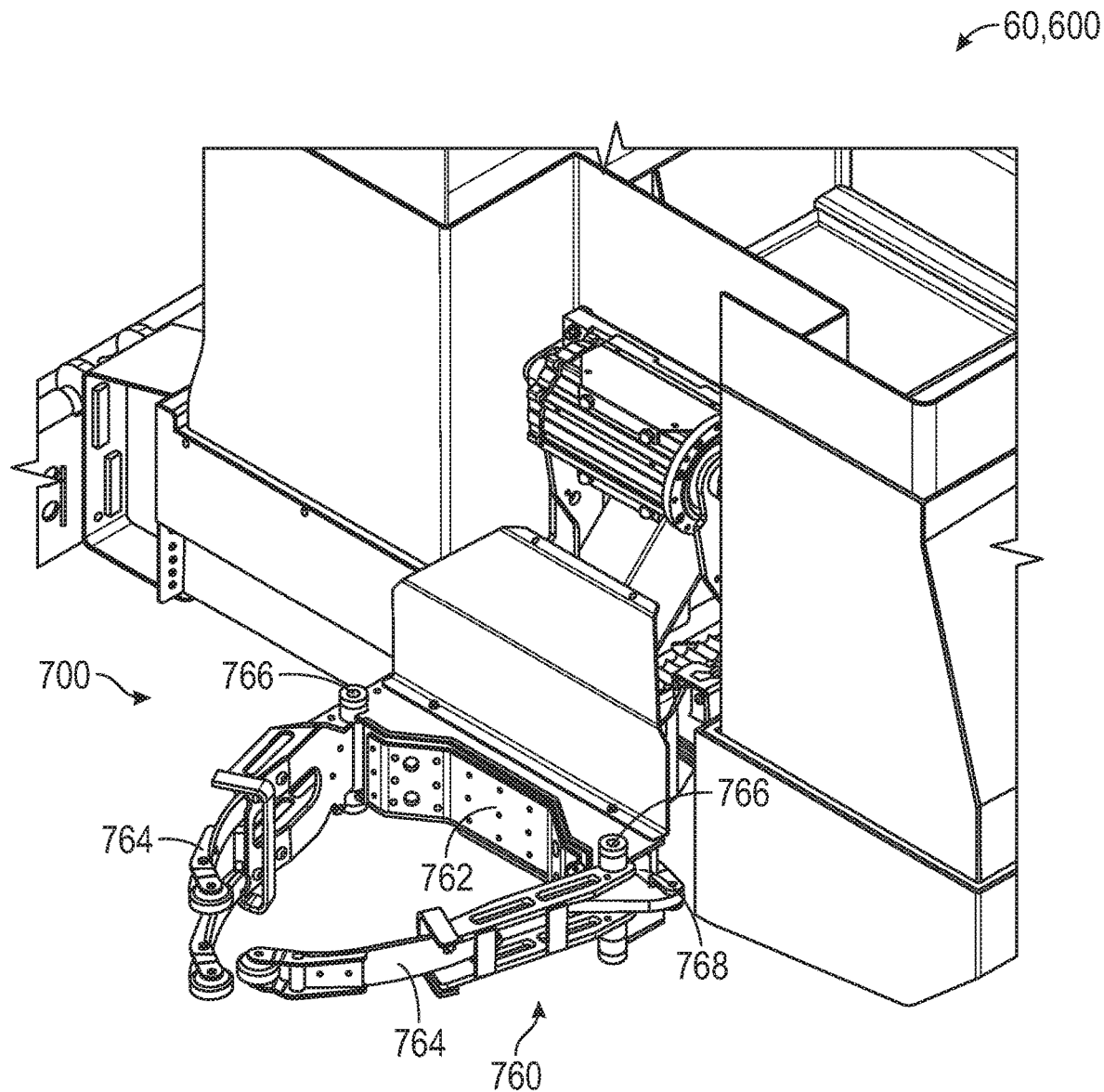
FIG. 21 is a perspective view of the carry can of FIG. 20 with the grabber mechanism of the robotic arm in a closed arrangement, according to an exemplary embodiment.

As shown in FIGS. 20-24, the grabber mechanism 760 includes a base portion, shown as grabber base 762, coupled to the lift arms 748 of the lift mechanism 740; a pair of arms, shown as grabber arms 764, pivotally coupled to opposing ends of the grabber base 762, about pivot points, shown as hinges 766; and third actuators, shown as grabber actuators 768, positioned to facilitate selectively pivoting the grabber arms 764 about the hinges 766 to open and close the grabber arms 764 between a nominal, open arrangement (see, e.g., FIG. 20) and a closed arrangement (see, e.g., FIG. 21). According to an exemplary embodiment, the grabber actuators 768 are electric actuators configured to be powered via electricity provided by the energy storage and/or generation system 20, the can energy storage and/or generation system 620, and/or another electrical source on the refuse vehicle 10 (e.g., a generator, solar panels, etc.). In an alternative embodiment, the grabber actuators 768 are fluidly operated actuators (e.g., hydraulic cylinders, hydraulic rotary actuators, pneumatic cylinders, pneumatic rotary vanes, etc.) operated by a fluid pump (e.g., a hydraulic pump, a pneumatic pump, etc.) driven by an electric motor (e.g., the electric motor 18, the secondary electric motor, an integrated motor of the fluid pump, etc.). In such an embodiment, the fluid pump may be positioned on the refuse vehicle 10 or on the carry can 600, and fluidly coupled to fluidly operated actuator via conduits.

Figure 22:
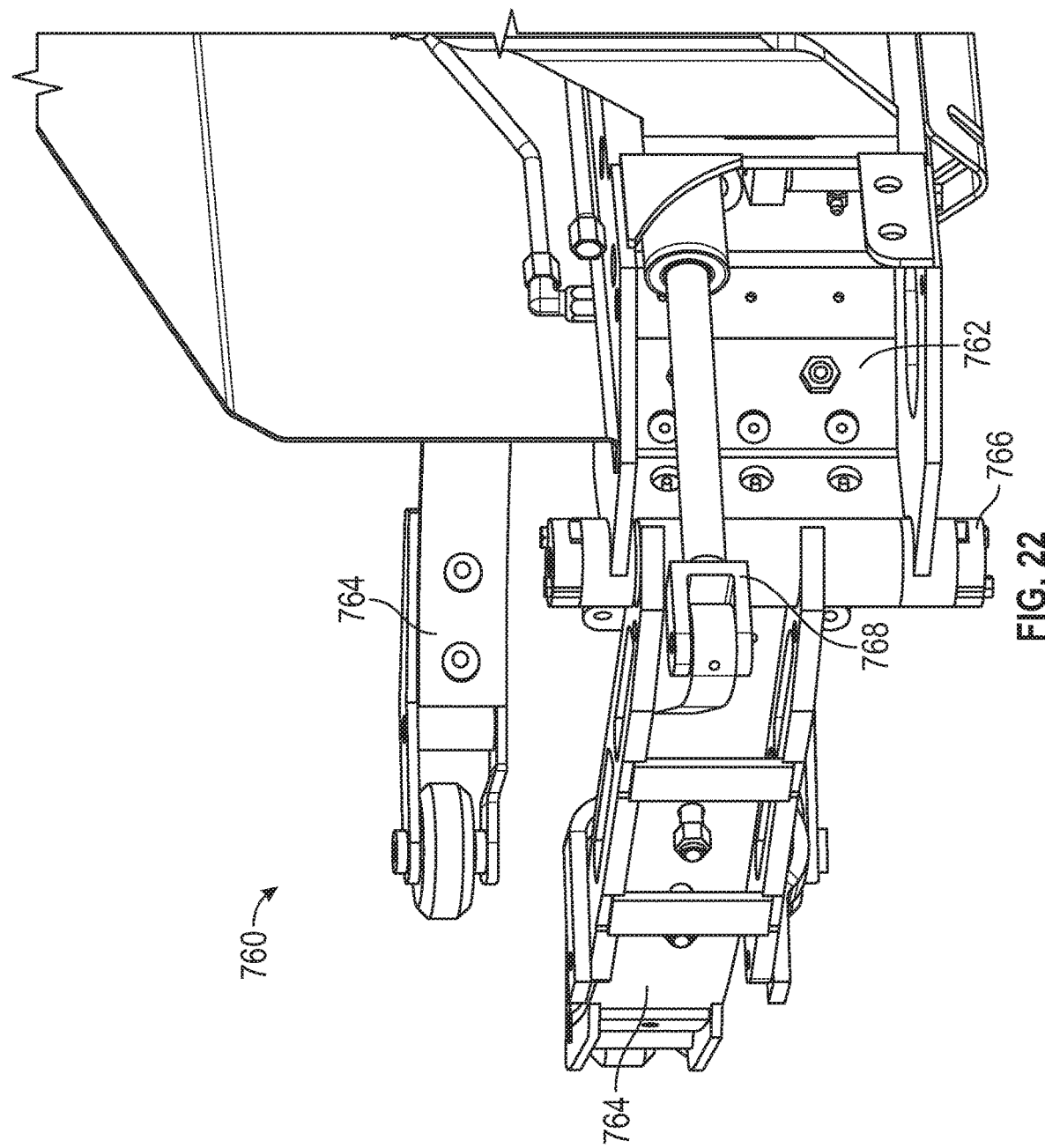
FIG. 22 is detailed view of a grabber mechanism of the robotic arm of FIG. 2 having a grabber actuator configured to open and close the grabber mechanism between a nominal, open arrangement and a closed arrangement, according to an exemplary embodiment.

As shown in FIG. 22, the grabber actuators 768 include linear electric actuators pivotally coupled to and extending between the grabber base 762 and the grabber arms 764. Such grabber actuators 768, therefore, may be configured to extend and retract to pivot the grabber arms 764 relative to the grabber base 762 about the hinges 766. In one embodiment, the grabber actuators 768 are or include ball screw linear actuators driven by an electric motor. In other embodiments, another type of electrically driven, linear actuators is used (e.g., a lead screw actuator, etc.). According to an exemplary embodiment, the grabber actuators 768 are positioned to facilitate selectively pivoting the grabber arms 764 relative to the grabber base 762 to engage and secure a refuse receptacle (e.g., a trash can, a recycling bin, etc.) to the robotic arm 700.

Figure 23:
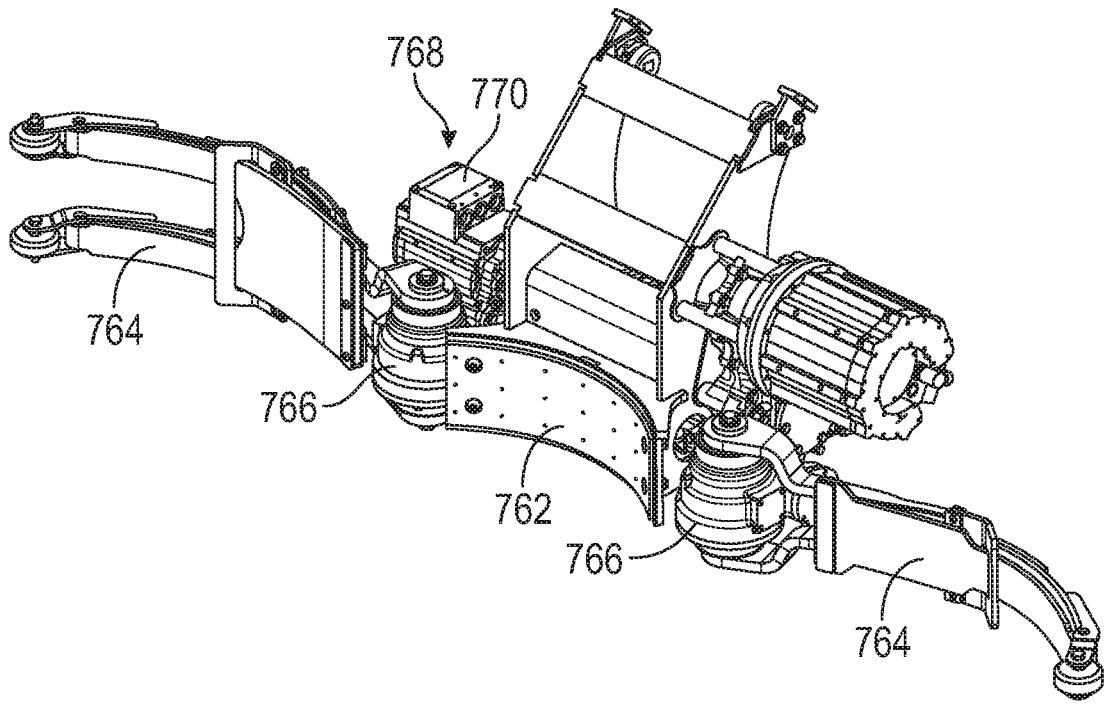
FIGS. 23 and 24 are detailed views of a grabber mechanism of the robotic arm of FIG. 2 having a grabber actuator configured to open and close the grabber mechanism between a nominal, open arrangement and a closed arrangement, according to another exemplary embodiment.
Figure 24:
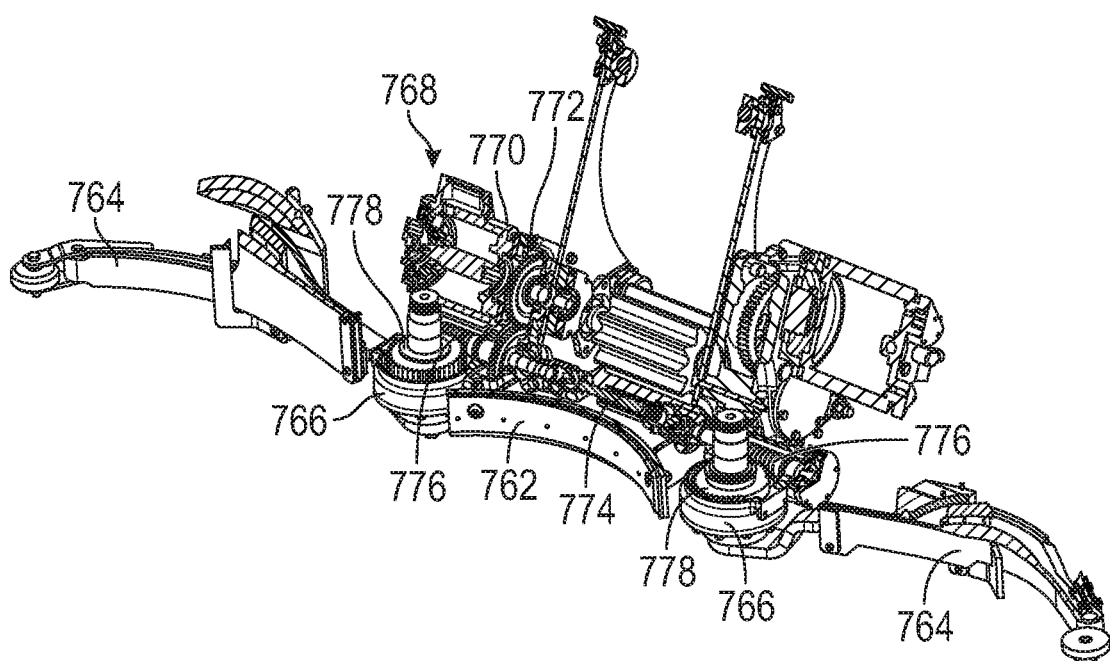
Figure 25:
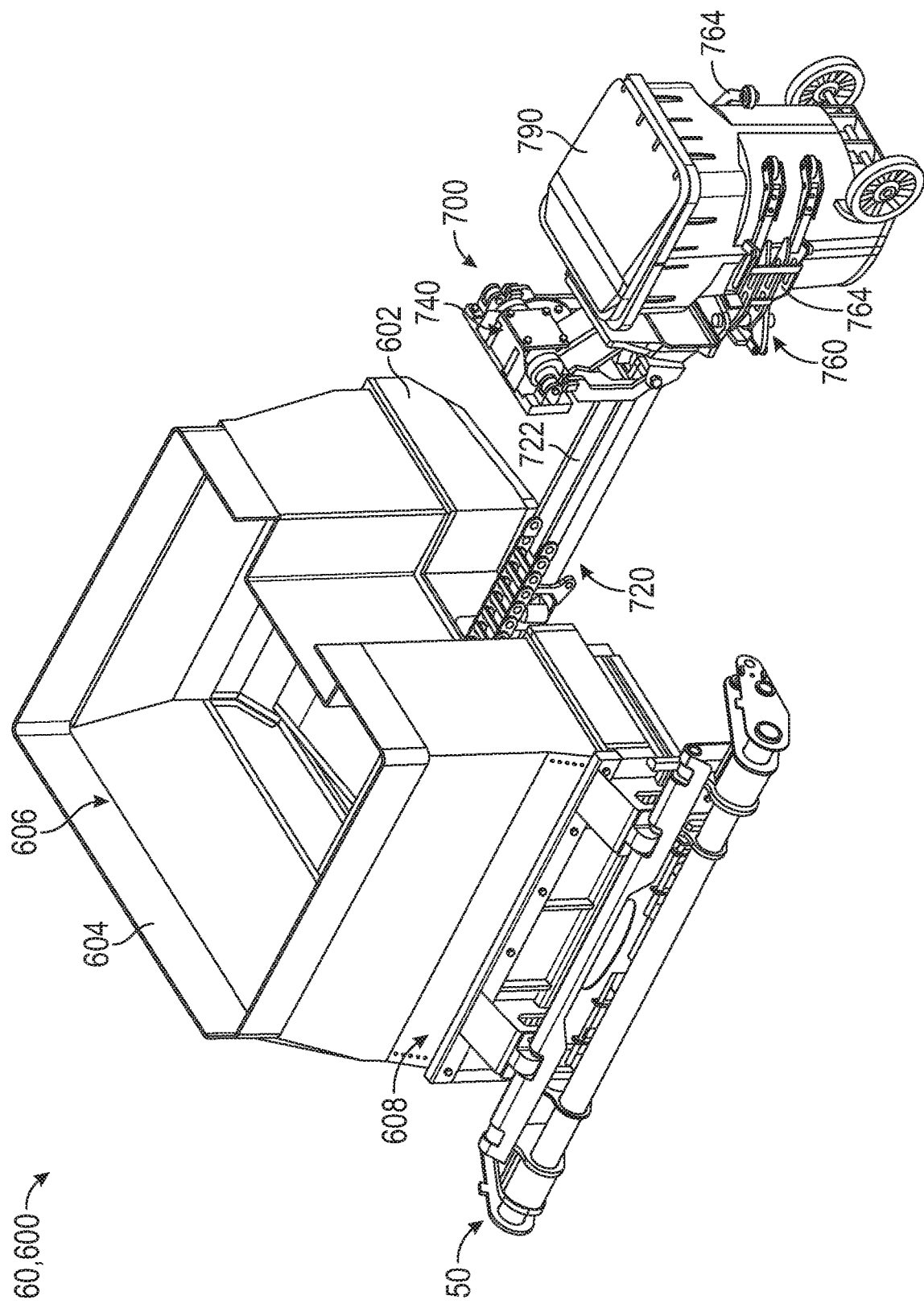
FIGS. 25-28 are various views of a process of the robotic arm of the carry can of FIG. 2 picking up a refuse container and dumping the contents therein into the carry can, according to an exemplary embodiment.
Figure 26:
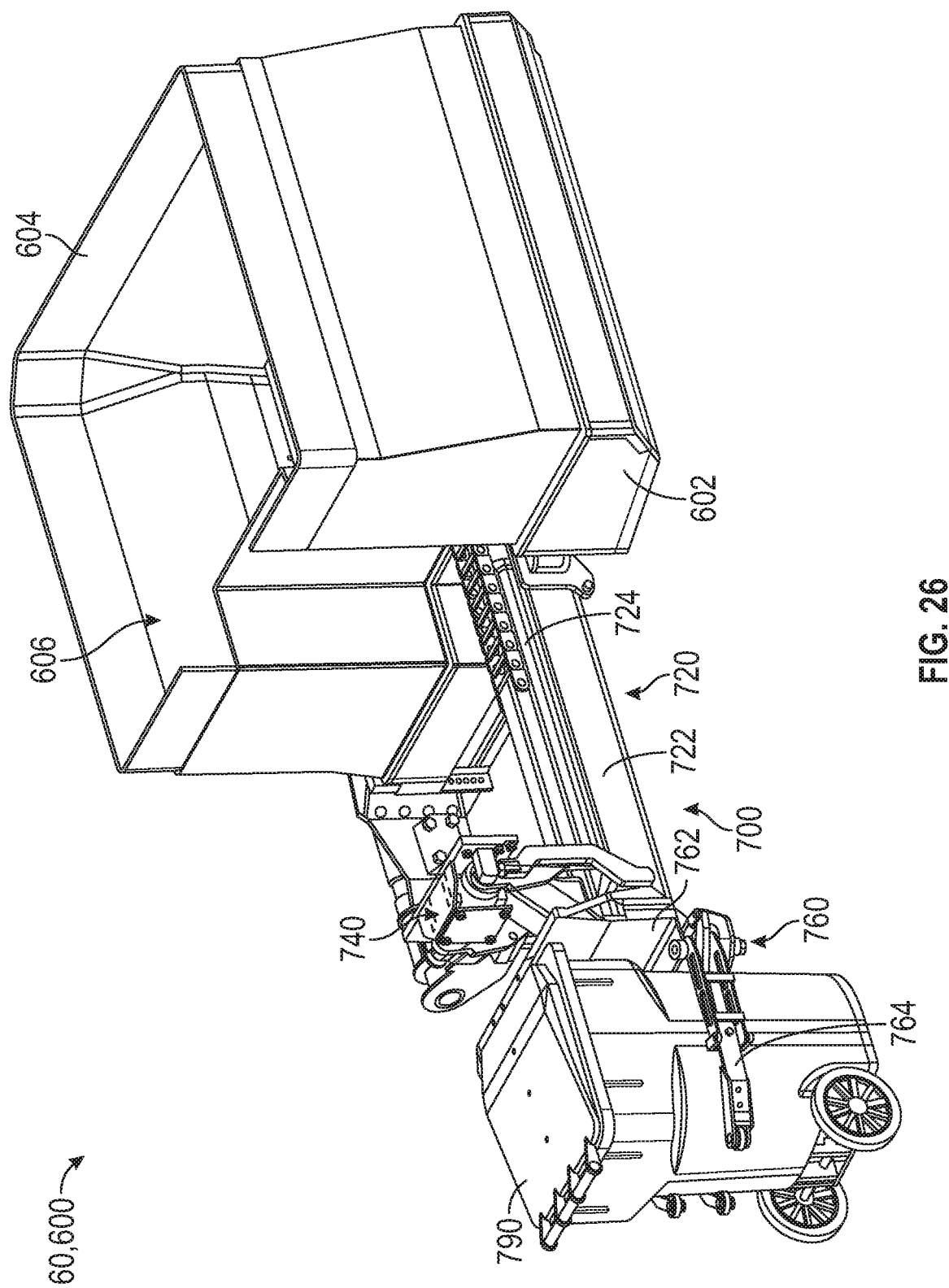
Figure 27:
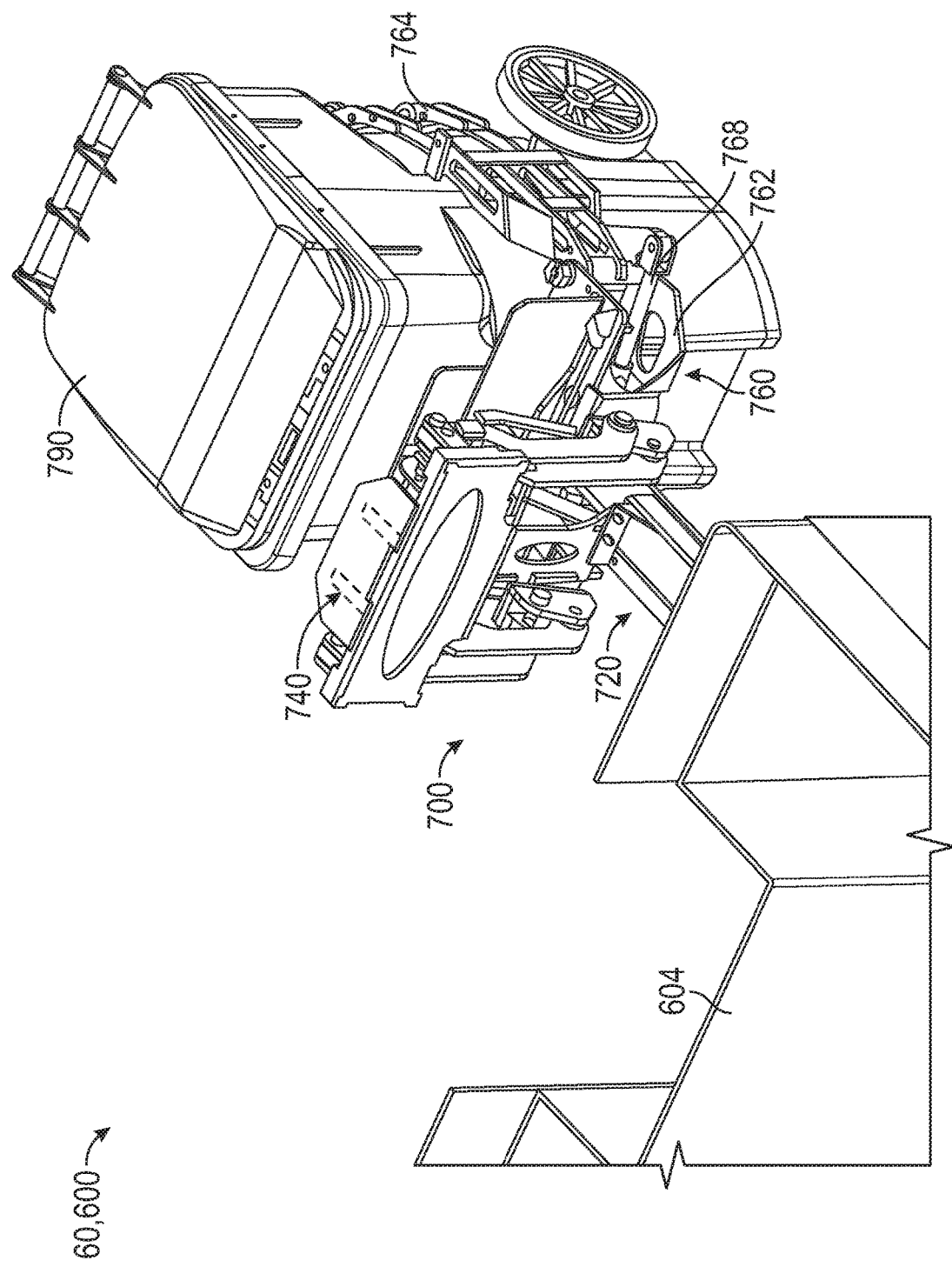
Figure 28:
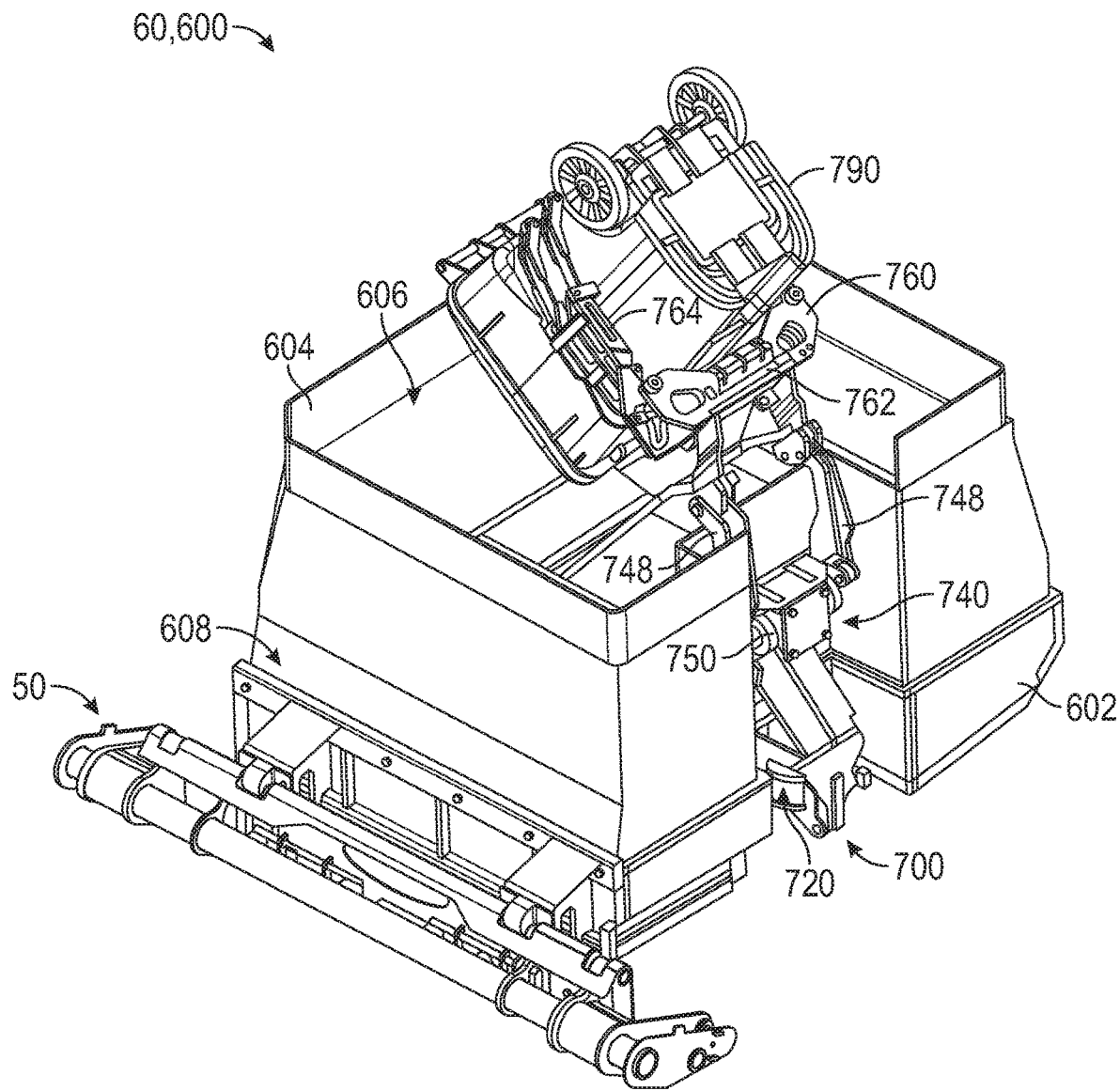

As shown in FIGS. 23 and 24, the grabber actuators 768 include a motor, shown as grip motor 770; a gearbox, shown as gearbox 772, including an input gear coupled to an output of the grip motor 770 and an output gear coupled to the input gear; a shaft, shown as connecting shaft 774, coupled to the output gear of the gearbox 772; a set of worm gears, shown as worm gears 776, coupled to opposing ends of the connecting shaft 774; and a set of pivot gears, shown as pivot gears 778, coupled to the worm gears 776 and disposed about the hinges 766. According to an exemplary embodiment, the grip motor 770 is configured to provide an output to the gearbox 772 (i.e., to the input gear of the gearbox 772), which transfers the output of the grip motor 770 to the connecting shaft 774 (i.e., through the output gear of the gearbox 772) to rotate the connecting shaft 774. The connecting shaft 774 then imparts its rotation onto the worm gears 776, which engage with the pivot gears 778, thereby causing the grabber arms 764 to pivot relative to the grabber base 762 about the hinges 766.

According to the exemplary embodiment shown in FIGS. 25-28, the extension actuator 724, the lift actuator 750, and the grabber actuators 768 are configured to facilitate (i) extending the robotic arm 700 from the container walls 604, (ii) grabbing a refuse receptacle 790, (iii) retracting the robotic arm 700 with the refuse receptacle 790, (iv) lifting/pivoting the refuse receptacle 790 to empty the contents thereof into the container refuse compartment 606, and (v) returning the refuse receptacle 790 to its initial location. The carry can 600 may thereafter be pivoted above the cab 16 of the refuse vehicle 10 using the lift assembly 40 to empty the contents therein into the refuse compartment 30 of the refuse vehicle 10.

In some embodiments, the carry can 600 includes a communication port/interface 804 configured to interface with an electrical connection, shown as connection harness 800 of the refuse vehicle 10 such that the carry can 600 is operable from within the cab 16 of the refuse vehicle 10 (e.g., receives commands therefrom, etc.). The connection harness 800 may also be configured to transfer power from (i) the energy storage and/or generation system 20 to (ii) the can energy storage and/or generation system 620 and/or the robotic arm 700 directly. In other embodiments, the carry can 600 includes a wireless communications interface/device 806 configured to wirelessly communicate with systems of the refuse vehicle 10 (e.g., via Wi-Fi, Bluetooth, NFC, ZigBee, etc.) such that the carry can 600 may be wirelessly operable from within the cab 16 of the refuse vehicle 10 and/or using a portable device (e.g., a tablet, a smartphone, etc.).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A carry can for a refuse vehicle, the carry can comprising:
    a container defining a refuse compartment, the container including a base and a container wall extending around a periphery of the base, a side of the container wall and the base defining a recess, the container including an interface positioned along a rear of the container and configured to facilitate selectively coupling the container to a lift assembly of the refuse vehicle, wherein the interface does not include fork pockets;
    an electric energy system including at least one of:
        a battery configured to store energy;
        a generator or solar panel configured to generate energy; or
        a power interface configured to receive energy from an electrical power source;
    a collection arm positioned along the side of the container, the collection arm including:
        an extension arm positioned beneath the container wall and extending laterally through the base, the extension arm including a chain disposed along the extension arm; and
        a grabber coupled to an end of the extension arm;
    a pivoting actuator assembly positioned to facilitate pivoting the grabber about a pivot axis, the pivoting actuator assembly including:
        a transmission device positioned along the pivot axis; and
        a first rotational actuator coupled to the transmission device and positioned along an offset axis, the offset axis parallel to and offset from the pivot axis such that the first rotational actuator causes the transmission device to drive the collection arm about the pivot axis and around the offset axis;

an extension actuator assembly including:
  a second rotational actuator positioned within the recess; and
  a pinion coupled to the second rotational actuator, the pinion positioned to interface with the chain disposed along the extension arm, the pinion driven by the second rotational actuator to extend the collection arm laterally outward from the side and the recess;
  wherein the first rotational actuator and the second electrical actuator are one of (i) an electrically operated actuator powered by the electric energy system or (ii) a fluidly operated actuator coupled to a fluid pump driven by an electric motor powered by the electric energy system.

2. A carry can for a refuse vehicle, the carry can comprising:
  a container including a base and a container wall extending around a periphery of the base, a side of the container wall and the base defining a recess, the container defining a refuse compartment;
  a power interface configured to receive energy from an external power source;
  a communications interface configured to receive commands from an external device;
  an articulating collection arm positioned along the side of the container, the articulating collection arm including:
    an extension arm positioned beneath the container wall and extending laterally through the base, the extension arm including a rack disposed along the extension arm; and
    a grabber coupled to an end of the extension arm;
    a pivoting actuator assembly positioned to facilitate pivoting the grabber arm about a pivot axis, the pivoting actuator assembly including:
      a transmission device positioned along the pivot axis; and
      a first electric motor coupled to the transmission device and positioned along an offset axis, the offset axis parallel to and offset from the pivot axis such that the first electric motor causes the transmission device to drive the grabber about the pivot axis and around the offset axis;
    an extension actuator assembly including:
      a second electric motor positioned within the recess; and
      a pinion coupled to the second electric motor, the pinion positioned to interface with the rack disposed along the extension arm, the pinion driven by the second electric motor to extend the articulating collection arm laterally outward from the side and the recess;
    wherein the first electric motor and the second electric motor are powered by the external power source via the power interface.

3. The carry can of claim 2, wherein the container does not include fork pockets.

* * * * *